(12) United States Patent
Ohama et al.

(10) Patent No.: US 8,409,033 B2
(45) Date of Patent: Apr. 2, 2013

(54) GOLF BALL

(75) Inventors: Keiji Ohama, Kobe (JP); Kazuya Kamino, Kobe (JP); Takahiro Sajima, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 742 days.

(21) Appl. No.: 12/391,702

(22) Filed: Feb. 24, 2009

(65) Prior Publication Data
US 2009/0247326 A1 Oct. 1, 2009

(30) Foreign Application Priority Data
Mar. 25, 2008 (JP) .................. 2008-077742

(51) Int. Cl.
*A63B 37/06* (2006.01)
(52) U.S. Cl. ...................................... 473/378
(58) Field of Classification Search .............. 473/378, 473/373, 374, 376
See application file for complete search history.

(56) References Cited

U.S. PATENT DOCUMENTS

| | | | |
|---|---|---|---|
| 4,347,338 | A | 8/1982 | Torii et al. |
| 5,874,038 | A | 2/1999 | Kasashima et al. |
| 5,947,844 | A | 9/1999 | Shimosaka et al. |
| 6,123,534 | A | 9/2000 | Kasashima et al. |
| 6,123,628 | A | 9/2000 | Ichikawa et al. |
| 6,582,325 | B1 | 6/2003 | Ichikawa et al. |
| 2001/0018372 | A1 | 8/2001 | Kasashima et al. |
| 2002/0094886 | A1 | 7/2002 | Sajima |
| 2003/0064831 | A1* | 4/2003 | Ichikawa et al. ............ 473/378 |
| 2003/0064832 | A1 | 4/2003 | Ichikawa et al. |
| 2005/0181891 | A1 | 8/2005 | Umezawa et al. |
| 2006/0193934 | A1 | 8/2006 | Aoyama et al. |
| 2008/0045360 | A1 | 2/2008 | Ohama et al. |

FOREIGN PATENT DOCUMENTS

| | | |
|---|---|---|
| JP | 58-2063 B2 | 1/1983 |
| JP | 10-127826 A | 5/1998 |
| JP | 2001-187172 A | 7/2001 |
| JP | 2001-212260 A | 8/2001 |
| JP | 2002-336386 A | 11/2002 |
| JP | 2008-43518 A | 2/2008 |

OTHER PUBLICATIONS

Japanese Office Action dated Dec. 18, 2012 for corresponding Application No. 2008-077742.

* cited by examiner

*Primary Examiner* — Raeann Gorden
(74) *Attorney, Agent, or Firm* — Birch, Stewart, Kolasch & Birch, LLP

(57) ABSTRACT

A golf ball 2 includes a center 12, a mid layer 14, a reinforcing layer 6, a cover 8 and a paint layer 10. The golf ball 2 has a large number of dimples 16 on the surface thereof. The cover 8 is formed of a resin composition including thermoplastic polyurethane (A) and a polyisocyanate mixture (B). The polyisocyanate mixture (B) includes a urethane prepolymer (B1) having two or more isocyanate groups or an isocyanate compound (B2) having three or more isocyanate groups. The polyisocyanate mixture (B) further includes a thermoplastic resin (B3) which substantially does not react with an isocyanate group. The golf ball 2 is obtained by a mold having protrusions which project from the equator of the mold. Each protrusion includes a part of a pimple.

9 Claims, 16 Drawing Sheets

; # GOLF BALL

This application claims priority on Patent Application No. 2008-77742 filed in JAPAN on Mar. 25, 2008. The entire contents of this Japanese Patent Application are hereby incorporated by reference.

BACKGROUND OF THE INVENTION

1. Field of the Invention

The present invention relates to golf balls. Specifically, the present invention relates to golf balls including a center, a mid layer, a cover and dimples.

2. Description of the Related Art

The greatest interest to golf players concerning golf balls is flight distance. In particular, golf players place importance on a flight distance upon a shot with a driver. By using a golf ball which has a long flight distance upon a shot with a driver, golf players can hit a second shot at a point close to the green.

Golf players also place importance on flight stability. By using a golf ball which has less-variable flight distance and flight direction, golf players can let the golf ball to land on a target point.

Further, golf players place importance also on spin performance of golf balls. If a backspin rate is high, the run is short. By using a golf ball which has a high backspin rate, golf players can let the golf ball to stop at a target point. If a sidespin rate is high, the golf ball tends to curve. By using a golf ball which has a high sidespin rate, golf players can intentionally let the golf ball to curve. A golf ball with excellent spin performance has excellent controllability. In particular, high-level golf players place importance on controllability of a shot with a short iron.

Golf balls have a large number of dimples on the surface thereof. The dimples disturb the air flow around the golf ball during flight to cause turbulent flow separation. By causing the turbulent flow separation, separation points of the air from the golf ball shift backwards leading to a reduction of drag. The turbulent flow separation promotes the displacement between the separating point on the upper side and the separating point on the lower side of the golf ball, which results from the backspin, thereby enhancing the lift force that acts upon the golf ball. The reduction of drag and the enhancement of lift force are referred to as a "dimple effect". Excellent dimples disturb the air flow more efficiently. The dimple effect provides a long flight distance.

Generally, golf balls are formed with a mold having upper and lower mold halves each having a hemispherical cavity. Assuming that the upper mold half cavity is the northern hemisphere of a globe and the lower mold half cavity is the southern hemisphere of the globe, the upper mold half and the lower mold half are mated at the equator face (the plane including the equator). A large number of pimples are provided on the inner surface of the mold, and dimples are formed on the surface of the golf ball by means of the pimples. The dimples have a shape inverted from the shape of the pimples.

Since the molding material (e.g. synthetic resin) leaks out from the parting face of the upper mold half and the lower mold half, a flash is generated along the equator portion on the surface of the golf ball. The flash is generated along the parting line. The flash is ground and removed with a whetstone or the like. Removal of a flash generated inside of the dimple is difficult. In order to facilitate the removal of the flash, any dimple is not formed on the equator. In other words, no pimple is provided on the parting face of the mold. A great circle path is formed on the seam of the golf ball obtained by this mold. The great circle path agrees with the equator. The great circle path does not intersect with any dimples. When this great circle path agrees with a part where the fastest circumferential speed of the backspin is attained (hereinafter, may be also referred to as a "fastest part"), a sufficient dimple effect can not be achieved. The dimple effect achieved when the great circle path agrees with the fastest part is inferior to the dimple effect achieved when the great circle path does not agree with the fastest part. The difference between these dimple effects deteriorates the aerodynamic symmetry of the golf ball. The great circle path further impairs the flight stability of the golf ball.

JP2002-159598 (US2002/94886) discloses a mold provided with a parting face having a horizontal plane and an inclined plane. In this mold, pimples can be arranged on the equator except at the parting face. This mold provides a golf ball having a non-smooth seam. This golf ball does not have a great circle path.

JP10-99469 (U.S. Pat. No. 5,947,844) discloses a mold having pins placed on the parting face. The pins form dimples on the golf ball. By this mold, a golf ball without a great circle path is obtained.

JP11-137727 (U.S. Pat. No. 6,123,534) discloses a mold provided with a parting face having bulges. The bulges form dimples on the golf ball. By this mold, a golf ball without a great circle path is obtained.

JP2005-224514 (US2005/181891) discloses a golf ball with a cover including thermoplastic polyurethane. The thermoplastic polyurethane contributes to the controllability of the golf ball.

JP11-178949 (U.S. Pat. No. 6,123,628 and U.S. Pat. No. 6,582,325) and JP2002-336378 (US2003/64831) each disclose a golf ball with a cover which is formed of a resin composition including polyurethane and an isocyanate compound. This resin composition contributes to the controllability of the golf ball. In addition, this isocyanate compound enhances the scuff resistance of the cover.

Upon a shot with a driver, the lower the spin rate is, the longer the flight distance tends to be. On the other hand, as described above, in light of controllability with a short iron, a higher spin rate is preferred. Recently, golf players' requirements for golf balls have been escalated more than ever. Golf players desire golf balls to have a long flight distance, less-variable flight direction and flight distance, and excellent controllability. An objective of the present invention is to provide a golf ball having a long flight distance, excellent flight stability, and excellent controllability.

SUMMARY OF THE INVENTION

A golf ball according to the present invention comprises a core, a cover positioned outside the core, and a large number of dimples formed on a surface of the cover. The core includes a center and a mid layer positioned outside the center. The cover is formed of a resin composition including thermoplastic polyurethane (A) and a polyisocyanate mixture (B). The polyisocyanate mixture (B) includes a urethane prepolymer (B1) having two or more isocyanate groups or an isocyanate compound (B2) having three or more isocyanate groups. The polyisocyanate mixture (B) further includes a thermoplastic resin (B3) which substantially does not react with an isocyanate group. The golf ball is formed by a mold. The mold includes a pair of mold halves and has a large number of pimples on a cavity face of the mold for forming the dimples. Each mold half has a plurality of protrusions which project from the equator of the mold. Each protrusion includes a part of one of the pimples. When one of the mold halves is mated with the other mold half, a central angle between any two adjacent protrusions is equal to or greater than 10° and equal to or less than 20°.

In the cover of the golf ball, the thermoplastic polyurethane (A) is crosslinked with the urethane prepolymer (B1) or the isocyanate compound (B2). The cover suppresses the spin upon a shot with a driver. The golf ball has a long flight distance upon a shot with a driver. A sufficient spin rate is obtained upon a shot with a short iron. The golf ball has excellent controllability upon a shot with a short iron. The golf ball has a less-variable flight direction when it is hit. In addition, the golf ball has excellent aerodynamic symmetry. By the synergistic effect of the stable flight direction and the excellent aerodynamic symmetry, the golf ball achieves excellent flight stability.

Preferably, the cover has a thickness of 0.1 mm or greater and 0.7 mm or less. Preferably, the cover has a hardness of 50 or less which is measured with a Shore D type spring hardness scale.

Preferably, an amount of isocyanate group (NCO %) in the polyisocyanate mixture (B) is equal to or greater than 0.1% by weight and equal to or less than 30% by weight. Preferably, an amount of the polyisocyanate mixture (B) is equal to or greater than 1 part by weight and equal to or less than 50 parts by weight, per 100 parts by weight of the thermoplastic polyurethane (A).

Preferably, the mold includes a protrusion (a); protrusion (b) adjacent to the protrusion (a); and protrusion (c) adjacent to the protrusion (a). Central angle θ1 between the protrusion (a) and the protrusion (b) is different from central angle θ2 between the protrusion (a) and the protrusion (c).

Preferably, a proportion P1 of a number of the protrusions (a), each of which has the central angle θ1 with the protrusion (b) different from the central angle θ2 with the protrusion (c), to the total number of the protrusions is equal to or greater than 50%.

Preferably, the pimple whose part is included in the protrusion has a diameter of 4.0 mm or greater.

A method for manufacturing a golf ball according to the present invention comprises the steps of:

(1) forming two half shells of a resin composition including thermoplastic polyurethane (A) and a polyisocyanate mixture (B) which includes a urethane prepolymer (B1) having two or more isocyanate groups or an isocyanate compound (B2) having three or more isocyanate groups; and a thermoplastic resin (B3) which substantially does not react with an isocyanate group;

(2) covering a core, including a center and a mid layer, with the two half shells;

(3) placing the core and the two half shells into a mold which includes a pair of mold halves and has a large number of pimples on a cavity face of the mold for forming dimples, each mold half having a plurality of protrusions which project from the equator of the mold, each protrusion including a part of one of the pimples, a central angle between any two adjacent protrusions being equal to or greater than 10° and equal to or less than 20° when one of the mold halves is mated with the other mold half; and (4) allowing the resin composition to flow in the mold, thereby forming the dimples having a shape inverted from the shape of the pimples and crosslinking the thermoplastic polyurethane (A) with the urethane prepolymer (B1) or the isocyanate compound (B2).

DESCRIPTION OF THE PREFERRED EMBODIMENTS

The following will describe in detail the present invention based on preferred embodiments with reference to the accompanying drawings.

Figure 1:
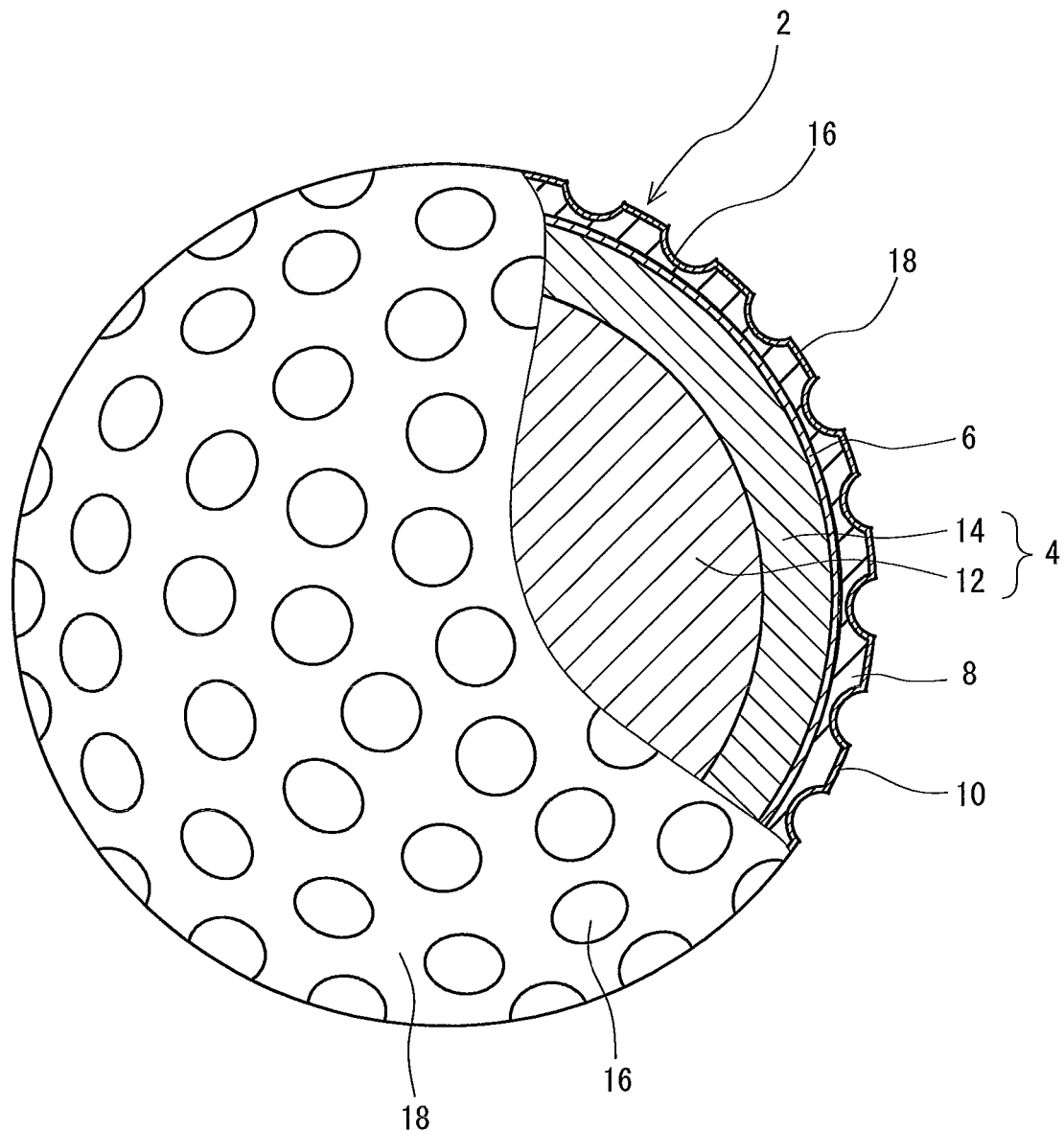
FIG. 1 is a partially cutaway plan view of a golf ball according to an embodiment of the present invention, showing a cross-section of the golf ball.

Golf ball 2 shown in FIG. 1 includes a spherical core 4, a reinforcing layer 6 positioned outside the core 4, a cover 8 positioned outside the reinforcing layer 6, and a paint layer 10 positioned outside the cover 8. The core 4 includes a spherical center 12 and a mid layer 14 positioned outside the center 12. The golf ball 2 has a large number of dimples 16 on the surface thereof. Of the surface of the golf ball 2, a part other than the dimples 16 is a land 18.

The golf ball 2 has a diameter in a range between 40 mm and 45 mm. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater and 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The center 12 is obtained by crosslinking a rubber composition. Examples of preferable base rubber include polybutadienes, polyisoprenes, styrene-butadiene copolymers, ethylene-propylene-diene copolymers and natural rubbers. In light of resilience performance, polybutadienes are preferred. When other rubber is used in combination with a polybutadiene, it is preferred if the polybutadiene is included as a principal component. Specifically, the proportion of the polybutadiene to the entire base rubber is preferably equal to or greater than 50% by weight and particularly preferably equal to or greater than 80% by weight. A polybutadiene having cis-1,4 bonds in a proportion of preferably 40 mol % or greater and particularly preferably 80 mol % or greater is preferred.

In order to crosslink the center 12, a co-crosslinking agent is preferably used. Examples of preferable co-crosslinking agents in light of resilience performance include monovalent or bivalent metal salts of an α,β-unsaturated carboxylic acid having 2 to 8 carbon atoms. Specific examples of preferable co-crosslinking agents include zinc acrylate, magnesium acrylate, zinc methacrylate and magnesium methacrylate. Zinc acrylate and zinc methacrylate are particularly preferred on the grounds that high resilience performance can be achieved.

As a co-crosslinking agent, an α,β-unsaturated carboxylic acid having 2 to 8 carbon atoms, and a metal oxide may be also included. Both components react in the rubber composition and form a salt. This salt contributes to the crosslinking reaction. Examples of preferable α,β-unsaturated carboxylic acids include acrylic acid and methacrylic acid. Examples of preferable metal oxides include zinc oxide and magnesium oxide.

In light of resilience performance of the golf ball 2, the amount of the co-crosslinking agent is preferably equal to or greater than 10 parts by weight and more preferably equal to or greater than 15 parts by weight, per 100 parts by weight of the base rubber. In light of soft feel at impact, the amount of the co-crosslinking agent is preferably equal to or less than 50 parts by weight and more preferably equal to or less than 45 parts by weight, per 100 parts by weight of the base rubber.

Preferably, the rubber composition of the center 12 includes an organic peroxide together with a co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy) hexane and di-t-butyl peroxide. An organic peroxide with particularly high versatility is dicumyl peroxide.

In light of resilience performance of the golf ball 2, the amount of the organic peroxide is preferably equal to or greater than 0.1 part by weight, more preferably equal to or greater than 0.3 part by weight, and particularly preferably equal to or greater than 0.5 part by weight, per 100 parts by weight of the base rubber. In light of soft feel at impact, the amount of the organic peroxide is preferably equal to or less than 3.0 parts by weight, more preferably equal to or less than 2.8 parts by weight, and particularly preferably equal to or less than 2.5 parts by weight, per 100 parts by weight of the base rubber.

Preferably, the rubber composition of the center 12 includes an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide and bis(2-cyano-5-bromophenyl)disulfide; trisubstitutions such as bis(2,4,6-trichlorophenyl)disulfide and bis(2-cyano-4-chloro-6-bromophenyl)disulfide; tetrasubstitutions such as bis(2,3,5,6-tetrachlorophenyl)disulfide; and pentasubstitutions such as bis(2,3,4,5,6-pentachlorophenyl)disulfide and bis(2,3,4,5,6-pentabromophenyl)disulfide. The organic sulfur compound contributes to the resilience performance of the golf ball 2. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 part by weight and more preferably equal to or greater than 0.2 part by weight, per 100 parts by weight of the base rubber. In light of soft feel at impact, the amount of the organic sulfur compound is preferably equal to or less than 1.5 parts by weight, more preferably equal to or less than 1.0 part by weight, and particularly preferably equal to or less than 0.8 part by weight, per 100 parts by weight of the base rubber.

For the purpose of adjusting specific gravity and the like, a filler may be included in the center 12. Examples of suitable fillers include zinc oxide, barium sulfate, calcium carbonate and magnesium carbonate. Powder of a metal with a high specific gravity may be included as a filler. Specific examples of metals with a high specific gravity include tungsten and molybdenum. The amount of the filler is determined as appropriate so that the intended specific gravity of the center 12 is accomplished. A particularly preferable filler is zinc oxide. Zinc oxide serves not only as a specific gravity adjuster but also as a crosslinking activator. According to need, various additives such as sulfur, an anti-aging agent, a coloring agent, a plasticizer and a dispersant may be included in the center 12 at an adequate amount. Crosslinked rubber powder or synthetic resin powder may be also included in the center 12.

The center 12 has a central hardness H1 of preferably 55 or greater and 80 or less. The center 12 having a central hardness H1 of 55 or greater can achieve excellent resilience performance of the golf ball 2. In this respect, the central hardness H1 is more preferably equal to or greater than 60 and particularly preferably equal to or greater than 65. The center 12 having a central hardness H1 of 80 or less suppresses the excessive spin upon a shot with a driver. In this respect, the central hardness H1 is more preferably equal to or less than 75 and particularly preferably equal to or less than 72. The central hardness H1 is measured by pressing a JIS-C type hardness scale against the central point of a cut plane of the center 12 which has been cut into two halves. For the measurement, an automated rubber hardness measurement machine (trade name "P1", available from Koubunshi Keiki Co., Ltd.), to which this hardness scale is mounted, is used.

The center 12 has a surface hardness H2 of preferably 65 or greater and 95 or less. The center 12 having a surface hardness H2 of 65 or greater can achieve excellent resilience performance of the golf ball 2. In this respect, the surface hardness H2 is more preferably equal to or greater than 70 and particularly preferably equal to or greater than 75. The center 12 having a surface hardness H2 of 95 or less can achieve excellent feel at impact of the golf ball 2. In this respect, the surface hardness H2 is more preferably equal to or less than 90 and particularly preferably equal to or less than 88. The surface hardness H2 is measured by pressing a JIS-C type hardness scale against the surface of the center 12. For the measurement, an automated rubber hardness measurement machine (trade name "P1", available from Koubunshi Keiki Co., Ltd.), to which this hardness scale is mounted, is used.

In light of resilience performance, the difference (H2−H1) between the surface hardness H2 and the central hardness H1 is preferably equal to or less than 30, more preferably equal to or less than 25, and particularly preferably equal to or less than 20. In light of suppression of spin upon a shot with a driver, the difference (H2−H1) is preferably equal to or greater than 10 and particularly preferably equal to or greater than 12.

In light of feel at impact, the center 12 has an amount of compressive deformation of preferably 2.0 mm or greater, more preferably 2.2 mm or greater, and particularly preferably 2.4 mm or greater. In light of resilience performance, the center 12 has an amount of compressive deformation of preferably 4.0 mm or less, more preferably 3.6 mm or less, and particularly preferably 3.4 mm or less.

Upon measurement of the amount of compressive deformation, the center 12 is placed on a hard plate made of metal. A cylinder made of metal gradually descends toward the center 12. The center 12, squeezed between the bottom face of the cylinder and the hard plate, becomes deformed. A migration distance of the cylinder, starting from the state in which an initial load of 98 N is applied to the center 12 up to the state in which a final load of 1274 N is applied thereto is the amount of compressive deformation.

In light of suppression of spin upon a shot with a driver, the center 12 has a diameter of preferably 36.0 mm or greater and 42.0 mm or less. The diameter is more preferably equal to or greater than 38.0 mm and particularly preferably equal to or greater than 39.0 mm. The diameter is more preferably equal to or less than 41.0 mm and particularly preferably equal to or less than 40.2 mm. The center 12 has a weight of preferably 25 g or greater and 42 g or less. The temperature for crosslinking the center 12 is generally equal to or greater than 140° C. and equal to or less than 180° C. The time period for crosslinking the center 12 is generally equal to or greater than 10 minutes and equal to or less than 60 minutes. The center 12 may be formed with two or more layers. The center 12 may have a rib on the surface thereof.

A thermoplastic resin composition is preferably used for the mid layer 14. Examples of the base polymer of this resin composition include ionomer resins, thermoplastic polyester elastomers, thermoplastic polyamide elastomers, thermoplastic polyurethane elastomers, thermoplastic polyolefin elastomers and thermoplastic polystyrene elastomers. Particularly, ionomer resins are preferred. Ionomer resins are highly elastic. As described later, the cover 8 of the golf ball 2 is thin. When the golf ball 2 is hit, the mid layer 14 significantly deforms due to the thinness of the cover 8. The mid layer 14 including an ionomer resin contributes to the resilience performance of the golf ball 2.

An ionomer resin and another resin may be used in combination. In this case, in light of resilience performance, the ionomer resin is included as a principal component of the base polymer. The proportion of the ionomer resin to the entire base polymer is preferably equal to or greater than 50% by weight, more preferably equal to or greater than 70% by weight, and particularly preferably equal to or greater than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an α-olefin, and 10% by weight or more and 20% by weight or less of an α,β-unsaturated carboxylic acid. This binary copolymer provides excellent resilience performance to the golf ball 2. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester. This ternary copolymer provides excellent resilience performance to the golf ball 2. For the binary copolymer and ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and ternary copolymer, a part of the carboxyl group is neutralized with a metal ion. Examples of metal ions for use in neutralization include sodium ion, potassium ion, lithium ion, zinc ion, calcium ion, magnesium ion, aluminum ion and neodymium ion. The neutralization maybe carried out with two or more types of metal ions. Particularly suitable metal ions in light of resilience performance and durability of the golf ball 2 are sodium ion, zinc ion, lithium ion and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan MK7320" and "Himilan MK7329", available from Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000" and "HPF2000", available from E.I. du Pont de Nemours and Company; and trade names "IOTEK 7010", "IOTEK 7030", "IOTEK 7510", "IOTEK 7520", "IOTEK 8000" and "IOTEK 8030", available from Exxon-Mobil Chemical Corporation. Two or more types of ionomer resins may be used in combination. An ionomer resin neutralized with a monovalent metal ion, and an ionomer resin neutralized with a bivalent metal ion may be used in combination.

For the purpose of adjusting specific gravity and the like, a filler may be included in the resin composition of the mid layer 14. Examples of suitable fillers include zinc oxide, barium sulfate, calcium carbonate and magnesium carbonate. Powder of a metal with a high specific gravity may be included as a filler. Specific examples of metals with a high specific gravity include tungsten and molybdenum. The amount of the filler is determined as appropriate so that the intended specific gravity of the mid layer 14 is accomplished. A coloring agent, and crosslinked rubber powder or synthetic resin powder may be also included in the mid layer 14.

In light of suppression of spin upon a shot with a driver, the mid layer 14 has a thickness of preferably 0.5 mm or greater and more preferably 0.7 mm or greater. In light of resilience performance of the golf ball 2, the mid layer 14 has a thickness of preferably 1.8 mm or less and more preferably 1.6 mm or less.

In light of suppression of spin upon a shot with a driver, the mid layer 14 has a hardness of preferably 60 or greater, more preferably 63 or greater, and particularly preferably 65 or greater. In light of feel at impact, the mid layer 14 has a hardness of preferably 75 or less and more preferably 72 or less.

In the present invention, the hardness of the mid layer 14 and the hardness of the cover 8 are measured according to the standards of "ASTM-D 2240-68". For the measurement, an automated rubber hardness measurement machine (trade name "P1", available from Koubunshi Keiki Co., Ltd.), to which a shore D type spring hardness scale is mounted, is used. For the measurement, a sheet, which is formed by hot press, is made of the same material as the mid layer 14 (or the cover 8), and has a thickness of about 2 mm, is used. Prior to the measurement, the sheet is maintained at 23° C. for two weeks. At the measurement, three sheets are stacked.

The reinforcing layer 6 is interposed between the mid layer 14 and the cover 8 for enhancing the adhesion therebetween. As described later, the cover 8 of the golf ball 2 is extremely thin. When such a thin cover 8 is hit by the edge of a clubface, a wrinkle is likely to occur. However, the reinforcing layer 6 prevents a wrinkle from occurring.

As the base polymer of the reinforcing layer 6, a two-component curing type thermosetting resin may be suitably used. Specific examples of two-component curing type thermosetting resins include epoxy resins, urethane resins, acrylic resins, polyester-based resins and cellulose-based resins. In light of mechanical properties (e.g. breaking strength) and durability of the reinforcing layer 6, two-component curing type epoxy resins and two-component curing type urethane resins are preferred.

The reinforcing layer 6 may include additives such as a coloring agent (typically, titanium dioxide), a phosphate-based stabilizer, an antioxidant, a light stabilizer, a fluorescent brightener, an ultraviolet absorber and an anti-blocking agent. The additives may be added to the base material of the two-component curing thermosetting resin, or may be added to the curing agent of the two-component curing thermosetting resin.

The reinforcing layer 6 is obtained by applying, to the surface of the mid layer 14, a liquid which is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer 6.

In light of prevention of a wrinkle, the reinforcing layer 6 has a thickness of preferably 3 μm or greater and more preferably 5 μm or greater. In light of ease of forming the reinforcing layer 6, the reinforcing layer 6 has a thickness of preferably 300 μm or less, more preferably 50 μm or less, and particularly preferably 20 μm or less. The thickness is measured by observing a cross section of the golf ball 2 with a microscope. When the mid layer 14 has concavities and convexities on its surface by surface roughening, the thickness of the reinforcing layer 6 is measured at a convex part.

In light of prevention of a wrinkle, the reinforcing layer 6 has a pencil hardness of preferably 4B or harder and more preferably B or harder. In light of reduced loss of the power transmission from the cover 8 to the mid layer 14 upon a hit of the golf ball 2, the reinforcing layer 6 has a pencil hardness of preferably 3H or softer. The pencil hardness of the reinforcing layer 6 is measured according to the standards of "JIS K5400".

When the mid layer 14 and the cover 8 sufficiently adhere to each other so that a wrinkle is unlikely to occur, the reinforcing layer 6 may not be provided.

The cover 8 is formed of a resin composition. This resin composition includes thermoplastic polyurethane (A) and a polyisocyanate mixture (B). The principal component of the resin composition is the thermoplastic polyurethane (A). The thermoplastic polyurethane (A) is flexible. The cover 8 using the polyurethane (A) has excellent scuff resistance.

The thermoplastic polyurethane (A) has a urethane bond within the molecule. The urethane bond can be formed by reacting a polyol with a polyisocyanate. The polyol, as a material for the urethane bond, has a plurality of hydroxyl groups. Low-molecular-weight polyols and high-molecular-weight polyols can be used.

Examples of low-molecular-weight polyols include diols, triols, tetraols and hexaols. Specific examples of diols include ethylene glycol, diethylene glycol, triethylene glycol, 1,2-propanediol, 1,3-propanediol, 2-methyl-1,3-propanediol, dipropylene glycol, 1,2-butanediol, 1,3-butanediol, 1,4-butanediol, 2,3-butanediol, 2,3-dimethyl-2,3-butanediol, neopentyl glycol, pentanediol, hexanediol, heptanediol, octanediol and 1,6-cyclohexanedimethylol. Aniline-based diols or bisphenol A-based diols may be used. Specific examples of triols include glycerin, trimethylol propane and hexanetriol. Specific examples of tetraols include pentaerythritol and sorbitol.

Examples of high-molecular-weight polyols include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PHMA); lactone polyester polyols such as poly-ε-caprolactone (PCL); polycarbonate polyols such as polyhexamethylene carbonate; and acrylic polyols. In light of feel at impact of the golf ball 2, the high-molecular-weight polyol has a number average molecular weight of preferably 400 or greater and more preferably 1000 or greater. The high-molecular-weight polyol has a number average molecular weight of preferably 10000 or less.

Examples of polyisocyanates, as a material for the urethane bond, include aromatic diisocyanates, alicyclic diisocyanates and aliphatic diisocyanates. Two or more types of diisocyanates may be used in combination.

Examples of aromatic diisocyanates include 2,4-toluene diisocyanate, 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylenediisocyanate (XDI), tetramethylxylene diisocyanate (TMXDI) and paraphenylene diisocyanate (PPDI). One example of aliphatic diisocyanates is hexamethylene diisocyanate (HDI). Examples of alicyclic diisocyanates include 4,4'-dicyclohexylmethane diisocyanate ($H_{12}$MDI), 1,3-bis(isocyanatemethyl)cyclohexane ($H_6$XDI), isophorone diisocyanate (IPDI) and trans-1,4-cyclohexane diisocyanate (CHDI).

A particularly preferable thermoplastic polyurethane (A) is an MDI-based polyurethane. In this polyurethane, a part or all of the isocyanate, as a material for the urethane component, is 4,4'-diphenylmethane diisocyanate (MDI). The MDI-based thermoplastic polyurethane has excellent versatility. This polyurethane is inexpensive.

Thermoplastic polyurethane (A) whose chain is extended by polyamine can be also used. This polyamine has two or more amino groups. Aliphatic polyamines such as ethylenediamine, propylenediamine, butylenediamine and hexamethylenediamine; alicyclic polyamines such as isophoronediamine and piperazine; and aromatic polyamines can be used.

Examples of the thermoplastic polyurethane (A) include:
(1) A type obtained from polyisocyanate and high-molecular-weight polyol;
(2) A type obtained from polyisocyanate, high-molecular-weight polyol and low-molecular-weight polyol;
(3) A type obtained from polyisocyanate, high-molecular-weight polyol and polyamine; and
(4) A type obtained from polyisocyanate, high-molecular-weight polyol, low-molecular-weight polyol and polyamine.

In light of scuff resistance and spin performance, the thermoplastic polyurethane (A) has a hardness of preferably 50 or less, more preferably 45 or less, and particularly preferably 40 or less. In light of strength of the cover 8, the thermoplastic polyurethane (A) has a hardness of preferably 20 or greater and more preferably 25 or greater. The hardness of the thermoplastic polyurethane (A) is measured according to the standards of "ASTM-D 2240-68" with a shore D type spring hardness scale mounted to an automated rubber hardness measurement machine (trade name "P1", available from Koubunshi Keiki Co., Ltd.). For the measurement, a slab formed by hot press and having a thickness of about 2 mm is used. The slab is made of the thermoplastic polyurethane (A).

A slab maintained at 23° C. for two weeks is used for the measurement. At the measurement, three slabs are stacked.

Specific examples of the thermoplastic polyurethane (A) include trade names "Elastollan XNY80A", "Elastollan XNY85A", "Elastollan XNY90A", "Elastollan XNY97A", "Elastollan XNY585" and "Elastollan XKP016N", available from BASF Japan Ltd.; and trade names "RESAMINE P4585LS" and "RESAMINE PS62490", available from Dainichiseika Color & Chemicals Mfg. Co., Ltd. In light of attainment of a reduced hardness of the cover, "Elastollan XNY80A", "Elastollan XNY85A" and "Elastollan XNY90A" are particularly preferred.

The polyisocyanate mixture (B) includes a urethane prepolymer (B1) having two or more isocyanate groups or an isocyanate compound (B2) having three or more isocyanate groups. The polyisocyanate mixture (B) further includes a thermoplastic resin (B3) which substantially does not react with an isocyanate group. By the heat applied during formation of the cover 8, the urethane prepolymer (B1) and the isocyanate compound (B2) react with the thermoplastic polyurethane (A). By this reaction, the molecules of the thermoplastic polyurethane (A) are crosslinked with each other. The cover 8 made of the crosslinked thermoplastic polyurethane (A) is hard. When the golf ball 2 with this cover 8 is hit with a driver, the flight direction varies less. This cover 8 achieves excellent flight stability. In addition, this cover 8 suppresses the spin upon a shot with a driver.

The urethane prepolymer (B1) has a urethane bond and two or more isocyanate groups. The prepolymer (B1) has a smaller molecular weight than the thermoplastic polyurethane (A). The prepolymer (B1) can be obtained by reacting a polyol with a polyisocyanate. The polyol described above as a material for the thermoplastic polyurethane (A) can be used as a material for the prepolymer (B1). The polyisocyanate described above as a material for the thermoplastic polyurethane (A) can be used as a material for the prepolymer (B1). 4,4'-diphenylmethanediisocyanate (MDI), which has excellent versatility, is preferred. A urethane prepolymer (B1) having an isocyanate group at an end thereof can be obtained by reacting a polyol with a polyisocyanate in a state where a polyisocyanate component is excessive. The mole ratio (NCO/OH) at the time of reaction is preferably equal to or greater than 1.1, more preferably equal to or greater than 1.3, and particularly preferably equal to or greater than 1.5. The mole ratio (NCO/OH) is preferably equal to or less than 3.0 and more preferably equal to or less than 2.0.

Because the urethane prepolymer (B1) includes a urethane component, even when the thermoplastic polyurethane (A) is crosslinked with the urethane prepolymer (B1), the hardness of the cover 8 does not increase considerably. The cover 8 including the urethane prepolymer (B1) maintains its flexibility. Upon a hit with a short iron of the golf ball 2 having this cover 8, the spin rate is high. The golf ball 2 has excellent controllability.

In light of flight stability and suppression of spin upon a shot with a driver, the amount of isocyanate group (NCO %) in the urethane prepolymer (B1) having two or more isocyanate groups is preferably equal to or greater than 0.1% by weight, more preferably equal to or greater than 0.2% by weight, and particularly preferably equal to or greater than 0.5% by weight. In light of controllability upon a shot with a short iron, the isocyanate group amount is preferably equal to or less than 10% by weight, more preferably equal to or less than 7% by weight, and particularly preferably equal to or less than 5% by weight. The isocyanate group amount X is calculated by the following formula.

$$X = ((I*42)/M)*100$$

In this formula, I denotes a number of moles of isocyanate group, M denotes the weight (g) of the urethane prepolymer (B1), and 42 is the molecular weight of NCO.

In light of controllability upon a shot with a short iron, the urethane prepolymer (B1) having two or more isocyanate groups has a number average molecular weight of preferably 1000 or greater, more preferably 1500 or greater, and particularly preferably 2000 or greater. In light of flight stability and suppression of spin upon a shot with a driver, the urethane prepolymer (B1) has a number average molecular weight of preferably 30000 or less, more preferably 20000 or less, and particularly preferably 10000 or less.

The preferable urethane prepolymer (B1) is represented by the following formula.

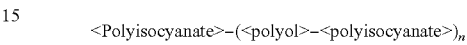

In this formula, n denotes an integer number of 1 or greater. In light of flight stability and suppression of spin upon a shot with a driver, n is preferably equal to or less than 10, more preferably equal to or less than 5, and particularly preferably equal to or less than 4. The urethane prepolymer (B1) represented by the above formula has polyisocyanates at both ends thereof. Preferably, the urethane prepolymer (B1) has difunctional polyisocyanates at both ends thereof.

In light of controllability upon a shot with a short iron, the polyol component in the urethane prepolymer (B1) has a number average molecular weight of preferably 650 or greater. In light of flight stability and suppression of spin upon a shot with a driver, the polyol component has a number average molecular weight of preferably 3000 or less.

The isocyanate compound (B2) having three or more isocyanate groups is more reactive than diisocyanates. Even a small amount of the polyisocyanate mixture (B) including the isocyanate compound (B2) can achieve a sufficient crosslinking density of the cover 8. The cover 8 including a small amount of the polyisocyanate mixture (B) does not impair the performance (resilience performance, controllability, scuff resistance and so on) of the golf ball 2.

Examples of the isocyanate compound (B2) having three or more isocyanate groups include triisocyanates, isocyanurates, adducts, allophanate-modified products and biuret-modified products. Specific examples of triisocyanates include polymeric MDI, triphenylmethane triisocyanate, tris(isocyanatephenyl)thiophosphate, lysine ester triisocyanate, 1,6,11-undecane triisocyanate, 1,8-diisocyanate-4-isocyanate methyloctane, 1,3,6-hexamethylene triisocyanate and bicycloheptane triisocyanate. One example of adducts is one obtained by reacting a diisocyanate with a low-molecular-weight triol. An adduct from which free diisocyanate is removed is preferred. One example of allophanate-modified products is one obtained by reacting a diisocyanate with a urethane bond formed by reacting a diisocyanate with a low-molecular-weight diol. One example of biuret-modified products is one obtained by reacting a diisocyanate with a urea bond formed by reacting a diisocyanate with a low-molecular-weight diamine.

Examples of isocyanates, as a starting material for each of the isocyanurates, the adducts, the allophanate-modified products, and the biuret-modified products, include 2,4-toluene diisocyanate, 2,6-toluene diisocyanate, 4,4'-diphenylmethane diisocyanate (MDI), 1,5-naphthylene diisocyanate (NDI), 2,6-naphthalene diisocyanate, m-phenylene diisocyanate, p-phenylene diisocyanate, tetramethylxylylene diisocyanate, 3,3'-dimethyl-4,4'-biphenylene diisocyanate, 3,3'-dimethoxy-4,4'-biphenylene diisocyanate, xylylene diisocyanate (XDI), tetramethylxylylene diisocyanate (TMXDI), 4,4'-dicyclohexylmethane diisocyanate (H₁₂MDI), hydrogenated xylylene diisocyanate (H₆XDI), hexamethylene diisocyanate (HDI), isophorone diisocyanate (IPDI), norbornene diisocyanate (NBDI), 4,4'-diisocyanate diphenyl ether, 1,3-diisocyanate methylcyclohexane, 1,4-diisocyanate methylcyclohexane and 1,4-diisocyanate cyclohexane.

Examples of a preferable isocyanate compound (B2) are diisocyanurates. Isophorone diisocyanurate, hexamethylene diisocyanurate and hydrogenated xylylene diisocyanurate are particularly preferred.

In light of flight stability and suppression of spin upon a shot with a driver, the amount of isocyanate group (NCO %) in the isocyanate compound (B2) is preferably equal to or greater than 10% by weight, more preferably equal to or greater than 12% by weight, particularly preferably equal to or greater than 15% by weight. In light of controllability upon a shot with a short iron, the isocyanate group amount is preferably equal to or less than 30% by weight, more preferably equal to or less than 27% by weight, and particularly preferably equal to or less than 25% by weight.

The isocyanate compound (B2) has a molecular weight of preferably 200 or greater, more preferably 350 or greater, and particularly preferably 500 or greater. The isocyanate compound (B2) has a molecular weight of preferably 2500 or less, more preferably 1500 or less, and particularly preferably 1000 or less. The molecular weight is measured by gel permeation chromatography.

During synthesizing of the isocyanate compound (B2) having three or more isocyanate groups, a compound having one or two isocyanate groups may be produced. In the present invention, the weight of the isocyanate compound (B2) includes the weight of this by-product. The proportion of the amount of by-product to the total amount of the isocyanate compound (B2) is preferably equal to or less than 30% by weight, more preferably equal to or less than 20% by weight, and particularly preferably equal to or less than 10% by weight.

In the polyisocyanate mixture (B), the urethane prepolymer (B1) or the isocyanate compound (B2) is dispersed in the thermoplastic resin (B3). The thermoplastic resin (B3) substantially does not react with an isocyanate group. In other words, the thermoplastic resin (B3) does not have hydrogen within the molecule which has a potential to react with an isocyanate group. By being dispersed in the thermoplastic resin (B3), the urethane prepolymer (B1) and the isocyanate compound (B2) are prevented from being inactivated. In addition, by being dispersed in the thermoplastic resin (B3), the urethane prepolymer (B1) and the isocyanate compound (B2) are easily mixed with the thermoplastic polyurethane (A).

As the thermoplastic resin (B3) which substantially does not react with an isocyanate group, an elastomer having rubber elasticity is suitable. Specific examples of such elastomers include thermoplastic polyester elastomers, styrene block-containing thermoplastic elastomers, thermoplastic polyolefin elastomers, thermoplastic acrylic elastomers, and thermoplastic vinyl chloride elastomers. Particularly, thermoplastic polyester elastomers and styrene block-containing thermoplastic elastomers are preferred. One specific example of thermoplastic polyester elastomers is trade name "Hytrel (e.g. 3046, 3548, 4047)" available from DU PONT-TORAY Co., Ltd. One specific example of styrene block-containing thermoplastic elastomers is trade name "Rabalon" available from Mitsubishi Chemical Corporation. Polystyrene, polyvinyl chloride, acrylic resin, acrylonitrile-butadiene-styrene copolymer, polyester, polycarbonate, polyolefin, polyacetal, fluororesin and ionomer resin may be used as the thermoplastic resin (B3) which substantially does not react with an isocyanate group.

The amount of the urethane prepolymer (B1) or the isocyanate compound (B2) and the amount of the thermoplastic resin (B3) in the polyisocyanate mixture (B) are adjusted such that a predetermined isocyanate group amount (NCO %) is achieved. In light of flight stability and suppression of spin upon a shot with a driver, the isocyanate group amount (NCO %) in the polyisocyanate mixture (B) is preferably equal to or greater than 0.1% by weight, more preferably equal to or greater than 0.2% by weight, and particularly preferably equal to or greater than 0.3% by weight. In light of controllability upon a shot with a short iron, the isocyanate group amount (NCO %) in the polyisocyanate mixture (B) is preferably equal to or less than 30% by weight, more preferably equal to or less than 10% by weight, and particularly preferably equal to or less than 7% by weight. When the polyisocyanate mixture (B) includes the urethane prepolymer (B1) and the thermoplastic resin (B3), the isocyanate group amount (NCO %) in the polyisocyanate mixture (B) is preferably equal to or greater than 0.1% by weight and equal to or less than 10% by weight. When the polyisocyanate mixture (B) includes the isocyanate compound (B2) and the thermoplastic resin (B3), the isocyanate group amount (NCO %) in the polyisocyanate mixture (B) is preferably equal to or greater than 5% by weight and equal to or less than 30% by weight.

The amount of the polyisocyanate mixture (B) in the resin composition of the cover 8 is preferably equal to or greater than 1 part by weight per 100 parts by weight of the thermoplastic polyurethane (A). By setting the amount of the polyisocyanate mixture (B) to be equal to or greater than 1 part by weight, flight stability is achieved, and spin is suppressed upon a shot with a driver. In this respect, the amount of the polyisocyanate mixture (B) is more preferably equal to or greater than 4 parts by weight and particularly preferably equal to or greater than 6 parts by weight. In light of controllability upon a shot with a short iron, the amount of the polyisocyanate mixture (B) is preferably equal to or less than 50 parts by weight, more preferably equal to or less than 40 parts by weight, and particularly preferably equal to or less than 30 parts by weight.

As described above, the principal component of the base resin of the cover 8 is the thermoplastic polyurethane (A). The proportion of the thermoplastic polyurethane (A) to all the resin is preferably equal to or greater than 50% by weight, more preferably equal to or greater than 60% by weight, and particularly preferably equal to or greater than 70% by weight. For the cover 8, other resin may be used in combination with the thermoplastic polyurethane (A). Examples of the other resin include thermoplastic polyamide elastomers, styrene block-containing thermoplastic elastomers, thermoplastic polyester elastomers, thermoplastic polyolefin elastomers and ionomer resins.

According to need, a coloring agent such as titanium dioxide, a filler such as barium sulfate, a dispersant, an antioxidant, an ultraviolet absorber, a light stabilizer, a fluorescent material, a fluorescent brightener and the like are included in the resin composition of the cover 8 at an adequate amount.

When preparing the resin composition of the cover 8, first, the urethane prepolymer (B1) or the isocyanate compound (B2) is blended with the thermoplastic resin (B3), which substantially does not react with an isocyanate group, to obtain first pellets. Meanwhile, various additives are added to the thermoplastic polyurethane (A) to obtain second pellets. The first pellets and the second pellets are mixed by dry blending to obtain a resin composition. By using the dry blending method, the crosslinking reaction of the thermoplastic polyurethane (A) with an isocyanate group is suppressed at the blending stage. The resin composition, in which the crosslinking reaction is suppressed, has a low viscosity when melting. The melting resin composition has excellent fluidity.

The cover 8 is formed of the resin composition. The cover 8 can be formed by injection molding or compression molding. Because the resin composition has excellent fluidity as described above, the cover 8 can be easily formed. By the heat applied during formation, crosslinking of the thermoplastic polyurethane (A) with the polyisocyanate mixture (B) starts, and the crosslinking reaction proceeds in the cavity. By the crosslinking reaction, strength is provided to the cover 8. The cover 8 is difficult to break, even by repeated hitting. The cover 8 is also difficult to wear out by frictional movement of a clubface thereagainst. The cover 8 suppresses the spin upon a shot with a driver. The golf ball 2 with the cover 8 has excellent flight stability.

When forming the cover 8, residue such as spew, runner and the like occurs. The residue can be reused as the thermoplastic polyurethane (A). Because crosslinking with the isocyanate group has already taken place in the residue, the cover 8 can have a high crosslinking density by using the residue. In light of crosslinking density, residue with a thermal history of a temperature of 180° C. or greater is preferred. Thermoplastic polyurethane (A) which is not crosslinked with an isocyanate group and the residue maybe used in combination. In this case, in light of crosslinking density, the proportion of the amount of the residue to the entire amount of thermoplastic polyurethane (A) is preferably equal to or greater than 10% by weight, more preferably equal to or greater than 20% by weight, and particularly preferably equal to or greater than 30% by weight. In light of fluidity of the resin composition, this proportion is preferably equal to or less than 70% by weight and more preferably equal to or less than 50% by weight.

In light of flight stability and suppression of spin upon a shot with a driver, the cover 8 has a hardness of preferably 20 or greater and more preferably 25 or greater. In light of controllability upon a shot with a short iron, the cover 8 has a hardness of preferably 50 or less, more preferably 45 or less, and particularly preferably 40 or less. The hardness of the cover 8 is measured according to the standards of "ASTM-D 2240-68" with a shore D type spring hardness scale mounted to an automated rubber hardness measurement machine (trade name "P1", available from Koubunshi Keiki Co., Ltd.). For the measurement, a slab formed by hot press and having a thickness of about 2 mm is used. A slab maintained at 23° C. for two weeks is used for the measurement. At the measurement, three slabs are stacked. A slab formed of the same resin composition as the cover 8 is used.

In light of durability of the golf ball 2, the cover 8 has a thickness of preferably 0.1 mm or greater, more preferably 0.2 mm or greater, and particularly preferably 0.3 mm or greater. In light of suppression of spin upon a shot with a driver, the cover 8 has a thickness of preferably 0.7 mm or less, more preferably 0.6 mm or less, and particularly preferably 0.5 mm or less.

Figure 2:
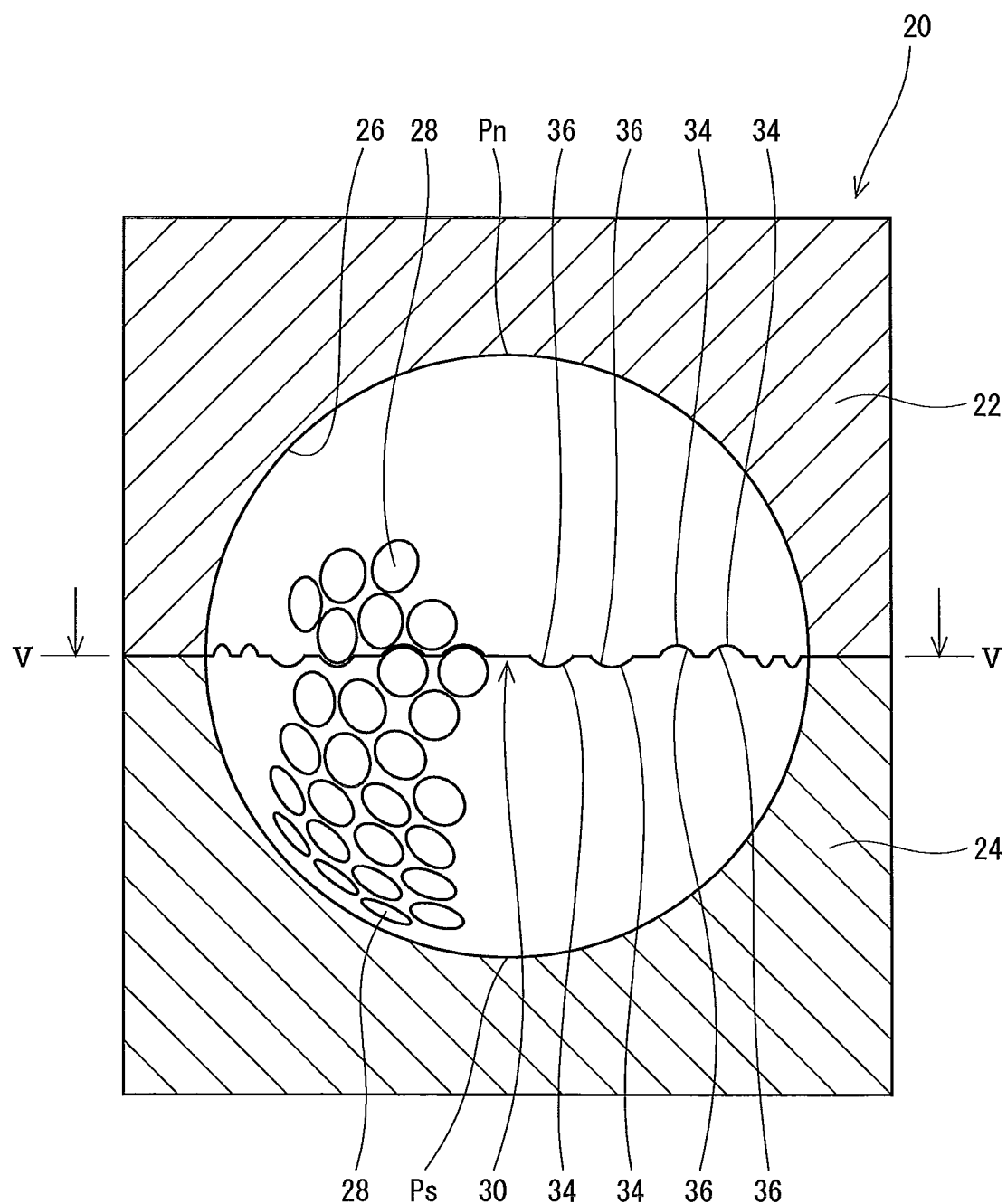
FIG. 2 is a cross-sectional view of a mold used for forming the golf ball in FIG. 1.
Figure 3:
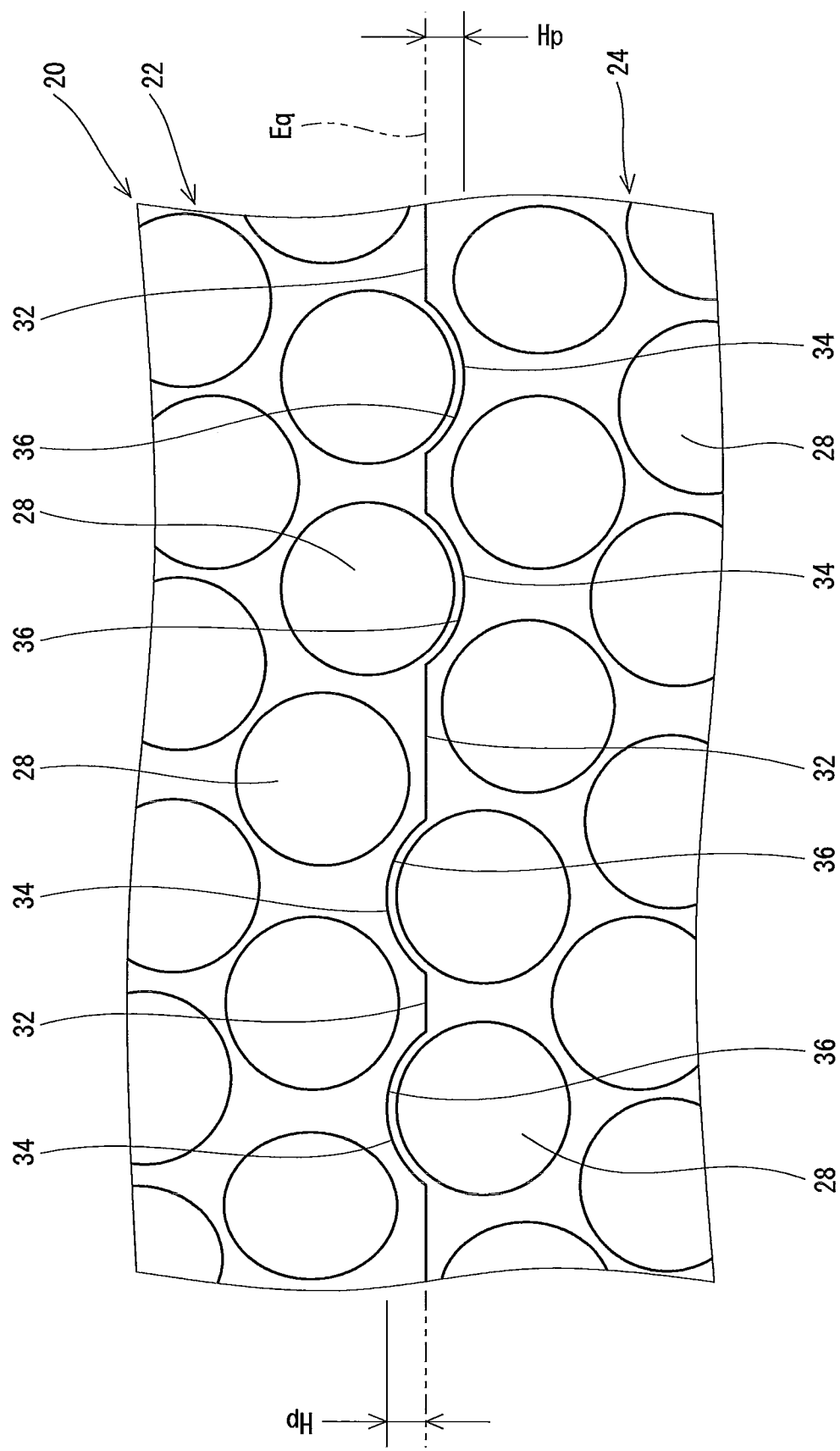
FIG. 3 is a partially enlarged view of the mold in FIG. 2.

FIG. 2 is a cross-sectional view of a mold 20 used for forming the golf ball 2 in FIG. 1. FIG. 3 is a partially enlarged view of the mold 20 in FIG. 2. The mold 20 includes a pair of mold halves. Specifically, the mold 20 includes an upper mold half 22 and a lower mold half 24. By mating the upper mold half 22 and the lower mold half 24, a spherical cavity is formed. A large number of pimples 28 are provided on a cavity face 26 of the upper mold half 22 and the lower mold half 24. The contour of the pimples 28 has a circular shape. Although only a few of the pimples 28 are shown in FIG. 2, a large number of pimples 28 are arranged over the entire cavity face 26. As is clear from FIG. 2, a parting face 30 between the upper mold half 22 and the lower mold half 24 has a non-flat shape. In FIG. 3, a chain double-dashed line indicated by reference sign Eq depicts the equator when the top of the cavity face 26 of the upper mold half 26 is assumed to be the north pole Pn of a globe (see FIG. 2) and the bottom of the cavity face 26 of the lower mold half 24 is assumed to be the south pole Ps of the globe.

Figure 4:
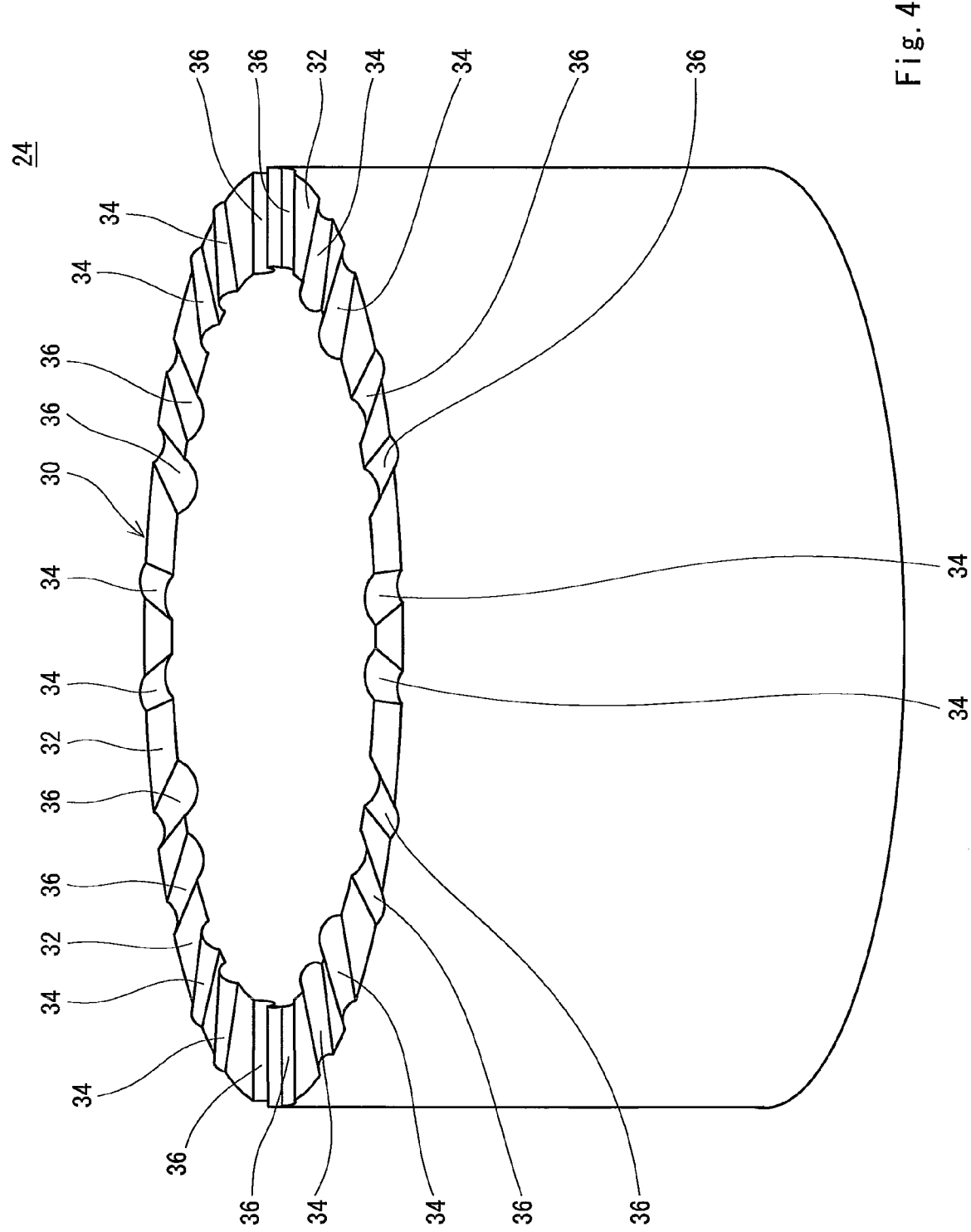
FIG. 4 is a perspective view of a lower mold half of the mold in FIG. 2.

FIG. 4 is a perspective view of the lower mold half 24 of the mold 20 shown in FIG. 2. The parting face 30 of the lower mold half 24 has flat planes 32, protrusions 34 and recesses 36. As is also shown in FIGS. 2 and 3, the flat planes 32 run along the equator Eq. The protrusions 34 project from the equator Eq. The recesses 36 are depressed from the equator Eq. A group consisting of two protrusions 34, and a group consisting of two recesses 36 are alternately arranged along the equatorial direction. The number of the protrusions 34 is 12. The number of the recesses 36 is 12. The number of the protrusions 34 is the same as the number of the recesses 36. Although not shown in the figure, the upper mold half 22 also has a large number of protrusions 34 and a large number of recesses 36, similarly. When the upper mold half 22 is mated with the lower mold half 24, the protrusions 34 of the lower mold half 24 are fitted with the recesses 36 of the upper mold half 22, while the recesses 36 of the lower mold half 24 are fitted with the protrusions 34 of the upper mold half 22.

Since the protrusions 34 of the lower mold half 24 are fitted with the recesses 36 of the upper mold half 22, the number of the recesses 36 of the upper mold half 22 is the same as the number of the protrusions 34 of the lower mold half 24. Since the protrusions 34 of the upper mold half 22 are fitted with the recesses 36 of the lower mold half 24, the number of the protrusions 34 of the upper mold half 22 is the same as the number of the recesses 36 of the lower mold half 24. In the mold 20, each number of the protrusions 34 of the upper mold half 22, the recesses 36 of the upper mold half 22, the protrusions 34 of the lower mold half 24, and the recesses 36 of the lower mold half 24 is 12. The mold 20 has 24 protrusions 34 in total. The mold 20 has 24 recesses 36 in total.

As is clear from FIG. 3, each protrusion 34 includes a part of the pimple 28. The periphery of the protrusion 34 forms a circular arc. The periphery substantially agrees with the contour of the pimple 28. Since the protrusion 34 projects from the equator Eq, the pimple 28 included in the protrusion 34 intersects with the equator Eq.

Figure 5:
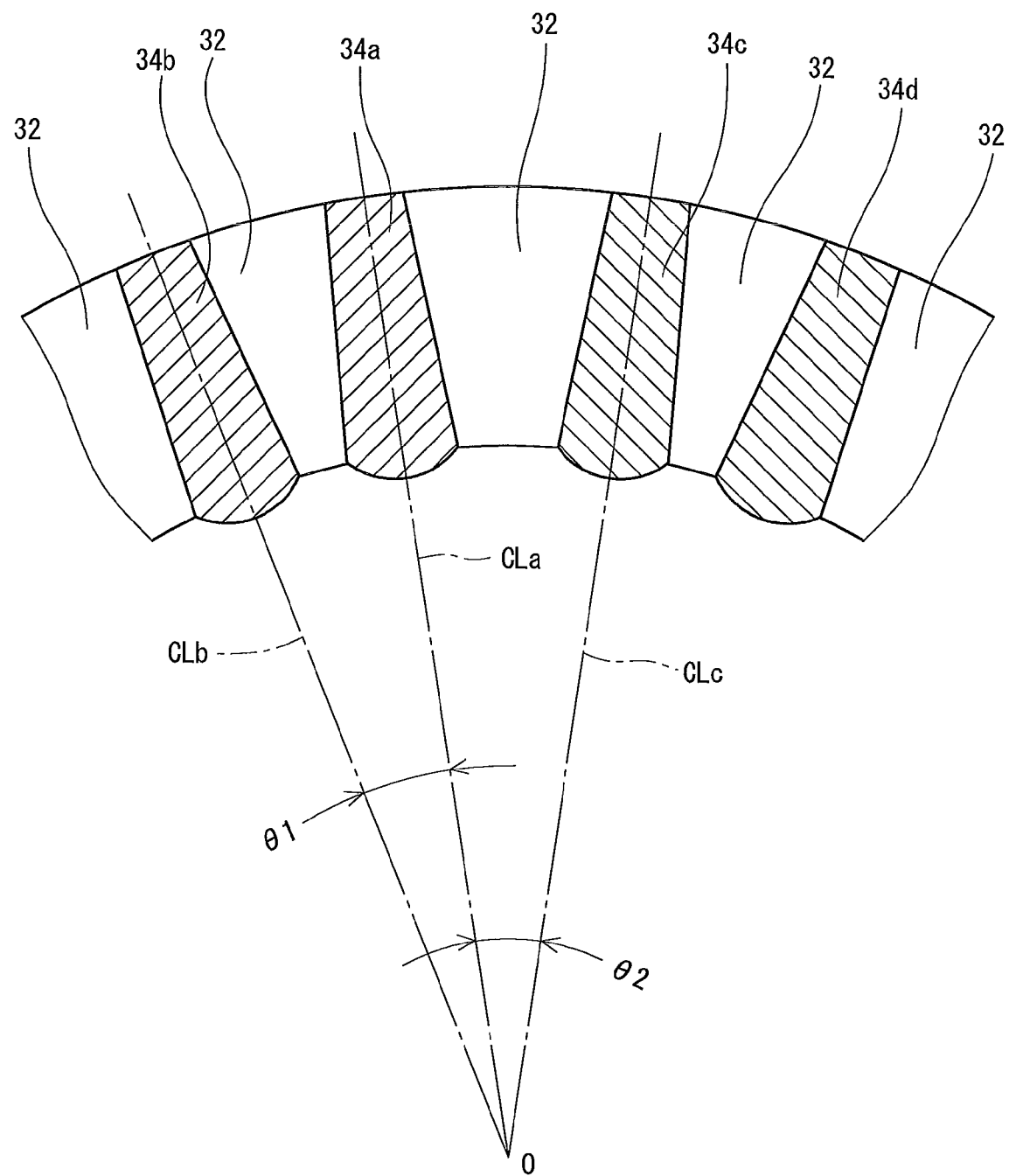
FIG. 5 is a partially enlarged cross-sectional view taken along the line V-V in FIG. 2.

FIG. 5 is an enlarged cross-sectional view taken along the line V-V in FIG. 2. This cross section is taken along the equator Eq. In FIG. 5, flat planes 32 of the lower mold half 24, two protrusions 34a and 34b of the lower mold half 24, and two protrusions 34c and 34d of the upper mold half 22 are depicted. The protrusion 34b is adjacent to the protrusion 34a. The protrusion 34a and the protrusion 34b belong to the same mold half. The protrusion 34c is adjacent to the protrusion 34a. The protrusion 34a and the protrusion 34c belong to the different mold halves. When any other protrusion 34 is not present between two protrusions 34, these two protrusions 34 are referred to as "adjacent".

In FIG. 5, what is indicated by reference sign 0 is the central point of the cavity. The center lines CLa, CLb, and CLc shown in FIG. 5 pass through the point 0. The center line CLa passes through the center, in the equatorial direction, of the protrusion 34a. The center line CLb passes through the center, in the equatorial direction, of the protrusion 34b. The center line CLc passes through the center, in the equatorial direction, of the protrusion 34c. In FIG. 5, what is indicated by reference sign θ1 is the central angle between the protrusion 34a and the protrusion 34b. In FIG. 5, what is indicated by reference sign θ2 is the central angle between the protrusion 34a and the protrusion 34c.

The mold 20 can be used in molding of golf balls. The mold 20 can be used in compression molding, injection molding, cast molding and the like. In any of these methods, a material is placed into the mold 20. The material flows in the mold 20, whereby dimples 16 having a shape inverted from the shape of the pimples 28 are formed.

Figure 6:
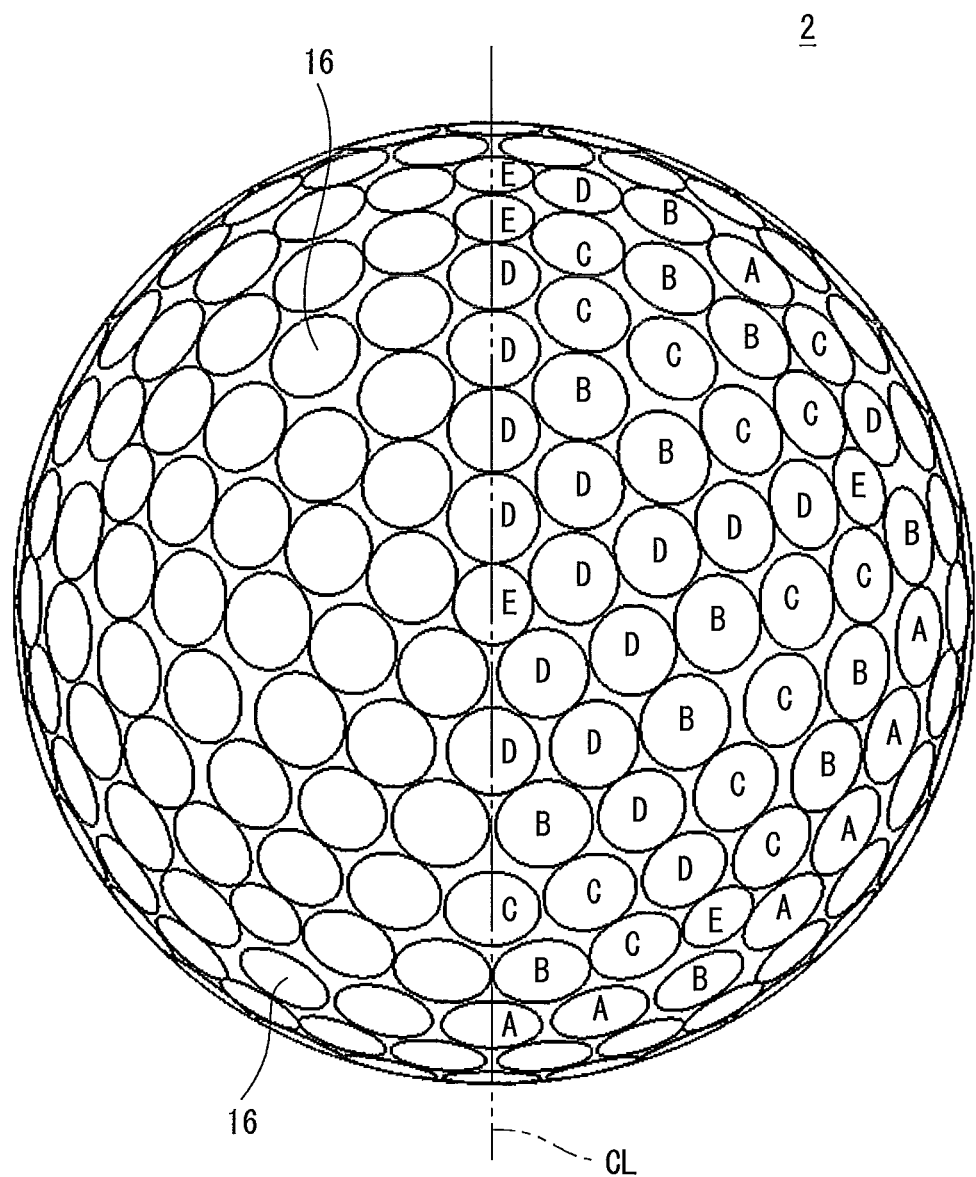
FIG. 6 is a plan view of the golf ball in FIG. 1.
Figure 7:
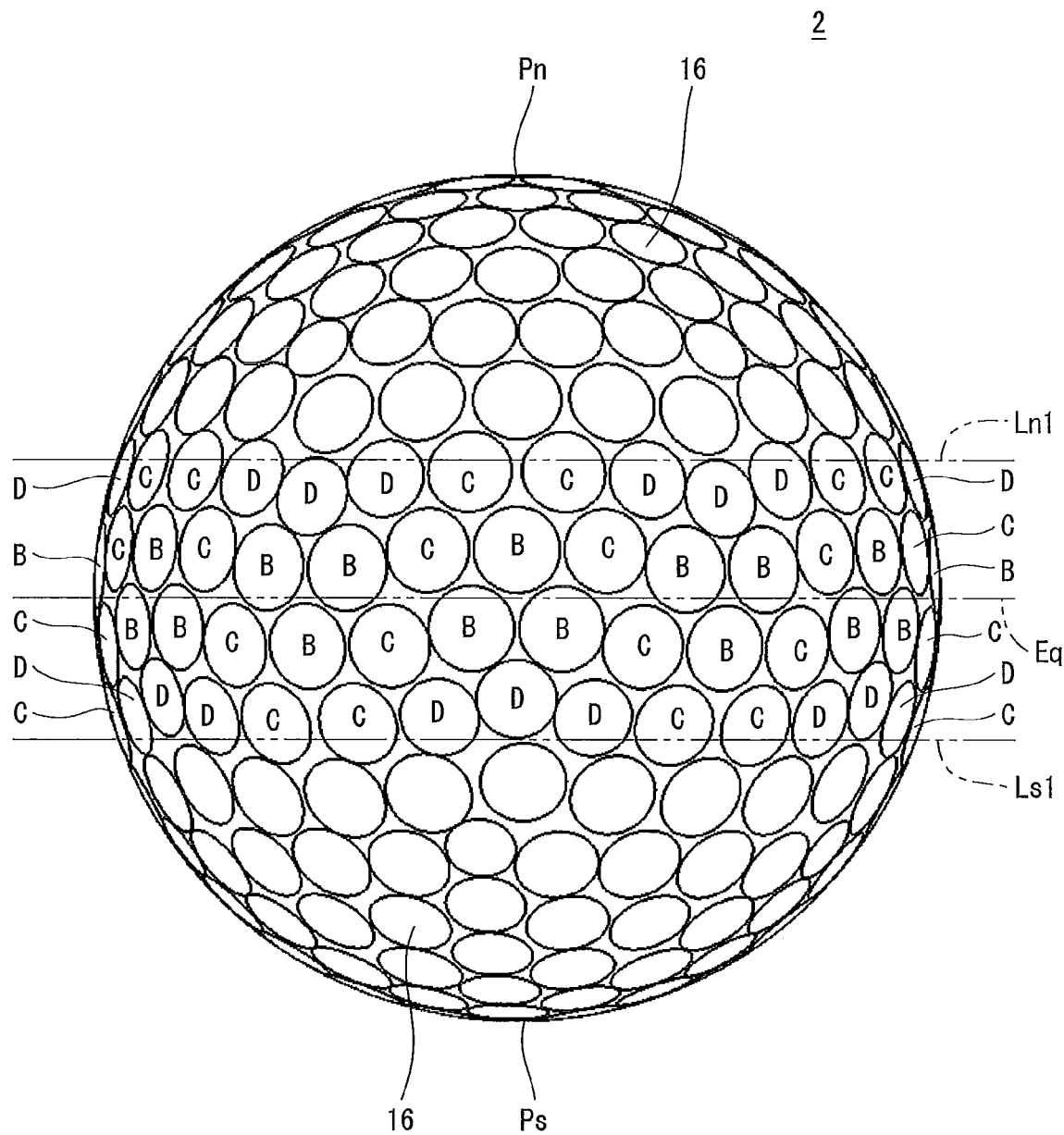
FIG. 7 is a front view of the golf ball in FIG. 6.

FIG. 6 is a plan view of the golf ball 2 obtained by the mold 20 shown in FIG. 2, and FIG. 7 is a front view of the same. The golf ball 2 has a large number of dimples 16 on the surface thereof. All the dimples 16 are circular. In FIGS. 6 and 7, the kinds of dimples 16 are indicated by reference signs A to E. The golf ball 2 has dimples A, dimples B, dimples C, dimples D and dimples E. The dimples A have a diameter of 4.50 mm; the dimples B have a diameter of 4.40 mm; the dimples C have a diameter of 4.30 mm; the dimples D have a diameter of 4.10 mm; and the dimples E have a diameter of 3.60 mm. The number of the dimples A is 26; the number of the dimples B is 88; the number of the dimples C is 102; the number of the dimples D is 94; and the number of the dimples E is 14. The total number of the dimples 16 on the golf ball 2 is 324.

In FIG. 7, what is indicated by reference sign Ln1 is the latitude line at latitude 20° north, and what is indicated by reference sign Ls1 is the latitude line at latitude 20° south. On the surface of the golf ball 2 or on the cavity face 26, the region enclosed by the latitude line Ln1 and the latitude line Ls1 is a low-latitude region. On the surface of the golf ball 2 or on the cavity face 26, the region other than the low-latitude region is a high-latitude region. In FIG. 6, the kinds of dimples 16 being present in the high-latitude region are shown. The dimple 16 whose center is positioned at a latitude beyond 20° corresponds to a "dimple being present in the high-latitude region". In FIG. 7, the kinds of dimples 16 being present in the low-latitude region are shown. The dimple 16 whose center is positioned at a latitude of 20° or below corresponds to a "dimple being present in the low-latitude region".

The dimple 16 has a shape inverted from the shape of the pimple 28. The dimple A is formed by means of a pimple A. The dimple B is formed by means of a pimple B. The dimple C is formed by means of a pimple C. The dimple D is formed by means of a pimple D. The dimple E is formed by means of a pimple E. The mold 20 shown in FIGS. 2 to 4 has 26 pimples A, 88 pimples B, 102 pimples C, 94 pimples D and 14 pimples E. The pimples A have a diameter of 4.50 mm; the pimples B have a diameter of 4.40 mm; the pimples C have a diameter of 4.30 mm; the pimples D have a diameter of 4.10 mm; and the pimples E have a diameter of 3.60 mm.

As described above, the mold 20 is provided with pimples 28 that intersect with the equator Eq. Thus, the golf ball 2 obtained by the mold 20 has dimples 16 that intersect with the equator Eq of the golf ball 2. Any great circle path is not formed on the equator Eq of the golf ball 2. The dimples 16 that intersect with the equator Eq enhance the dimple effect when the equator Eq agrees with the fastest part of the backspin. The golf ball 2 has excellent aerodynamic symmetry. The golf ball 2 also does not have a great circle path that does not agree with the equator. The golf ball 2 has excellent appearance.

The central angles θ1 and θ2 of all the pimple pairs on the equator Eq of the mold 20 are equal to or less than 200. Thus, the central angles of all the dimple pairs on the equator Eq of the golf ball 2 are also equal to or less than 200. On the golf ball 2, the dimples 16 are densely arranged on the equator Eq. The golf ball 2 has excellent aerodynamic symmetry and appearance. The synergistic effect of the excellent aerodynamic symmetry and the cover 8 crosslinked with the polyisocyanate mixture (B) achieves excellent flight stability of the golf ball 2. In light of flight stability, the central angles θ1 and θ2 are preferably equal to or less than 19° and more preferably equal to or less than 18°. In light of ease of producing the mold 20, the central angles θ1 and θ2 are preferably equal to or greater than 10°, more preferably equal to or greater than 11°, and particularly preferably equal to or greater than 12°.

By the mold 20 in which the central angle θ1 is different from the central angle θ2, the golf ball 2 having the dimples 16 arranged on the equator Eq at irregular intervals is obtained. The golf ball 2 achieves a superior dimple effect when the equator Eq agrees with the fastest part of the backspin. The golf ball 2 has excellent aerodynamic symmetry. In light of aerodynamic symmetry, the absolute value of the difference (θ1−θ2) between the central angle θ1 and the central angle θ2 is preferably equal to or greater than 3° and more preferably equal to or greater than 6°. The absolute value of the difference is preferably equal to or less than 10°. It is preferred if all the central angles θ1 are the same. Also, it is preferred if all the central angles θ2 are the same.

The proportion P1 of the number of the protrusions 34 that meet the following requirement 1 to the total number of the protrusions 34 is equal to or greater than 50%.

Requirement 1: the central angle θ1 with an adjacent protrusion 34 being different from the central angle θ2 with the other adjacent protrusion 34.

The golf ball 2 obtained by the mold 20 and having a proportion P1 of 50% or greater has excellent aerodynamic symmetry. In this respect, the proportion P1 is more preferably equal to or greater than 60% and particularly equal to 100%. In the mold 20 shown in FIG. 2, the proportion P1 is 100%.

As is clear from FIG. 7, a large number of dimples B intersect with the equator Eq of the golf ball 2. The dimple B has a large diameter. The golf ball 2 on which the dimples 16 having a large diameter intersect with the equator Eq achieves a superior dimple effect when the equator Eq agrees with the fastest part of the backspin. The golf ball 2 has excellent aerodynamic symmetry. In light of aerodynamic symmetry, the dimple 16 that intersects with the equator Eq has a diameter of preferably 4.0 mm or greater, more preferably 4.2 mm or greater, and particularly preferably 4.4 mm or greater. In light of avoidance of noticeable deformation of the dimple 16 due to removal of the flash, the dimple 16 that intersects with the equator Eq has a diameter of preferably 5.0 mm or less. It is preferred if all the dimples 16 that intersect with the equator Eq have a diameter falling within the above range. In other words, the pimple 28 that intersects with the equator Eq of the mold 20 has a diameter of preferably 4.0 mm or greater, more preferably 4.2 mm or greater, and particularly preferably 4.4 mm or greater. The pimple 28 that intersects with the equator Eq of the mold 20 has a diameter of preferably 5.0 mm or less. It is preferred if all the pimples 28 that intersect with the equator Eq have a diameter falling within the above range.

In light of aerodynamic symmetry, all the dimples 16 that are present in the low-latitude region have a diameter of preferably 4.0 mm or greater and more preferably 4.1 mm or greater. In other words, all the pimples 28 that are present in the low-latitude region of the mold 20 have a diameter of preferably 4.0 mm or greater and more preferably 4.1 mm or greater. On the golf ball 2 shown in FIG. 7, dimples B, dimples C and dimples D are present in the low-latitude region. All the dimples 16 that are present in the low-latitude region of the golf ball 2 have a diameter of 4.1 mm or greater.

The golf ball 2 on which a large number of dimples 16 intersect with the equator Eq has excellent aerodynamic symmetry. In this respect, the number of the dimples 16 that intersect with the equator Eq is preferably equal to or greater than 18, more preferably equal to or greater than 20, and particularly preferably equal to or greater than 24. Due to possibility of arranging large dimples 16 on the equator Eq, the number of the dimples 16 that intersect with the equator Eq is preferably equal to or less than 33 and more preferably equal to or less than 30. In the mold 20 shown in FIG. 2, the number of the pimples 28 that intersect with the equator Eq is 24. Thus, on the golf ball 2 shown in FIG. 7, the number of the dimples 16 that intersect with the equator Eq is 24.

As described above, the protrusion 34a (see FIG. 5) is adjacent to the protrusion 34b which belongs to the same mold half as the protrusion 34a, and adjacent to the protrusion 34c which belongs to a mold half which is different from that of the protrusion 34a. According to the golf ball 2 obtained by the mold 20, when the fastest part agrees with the equator, the dimples 16 which sequentially appear on the equator Eq due to the backspin belong to:

"southern hemisphere, southern hemisphere, northern hemisphere, northern hemisphere, southern hemisphere, southern hemisphere, northern hemisphere, northern hemisphere - - - ". The dimples 16 appearing in this pattern achieve a superior dimple effect. The golf ball 2 has excellent aerodynamic symmetry.

It is preferred if the proportion P2 of the number of the protrusions 34 that meet the following requirement 2 to the total number of the protrusions 34 is equal to or greater than 50%.

Requirement 2: being adjacent to a protrusion 34 which belongs to the same mold half, and also being adjacent to a protrusion 34 which belongs to the different mold half.

The golf ball 2 obtained by the mold 20 and having the proportion P2 of 50% or greater has excellent aerodynamic symmetry. In this respect, the proportion P2 is more preferably equal to or greater than 60% and particularly preferably 100%. In the mold 20 shown in FIG. 2, the proportion P2 is 100%.

The proportion P3 of the number of the protrusions 34 that meet both of the aforementioned requirements 1 and 2 to the total number of the protrusions 34 is preferably equal to or greater than 50%. The golf ball 2 obtained by the mold 20 and having the proportion P3 of 50% or greater has excellent aerodynamic symmetry. In this respect, the proportion P3 is more preferably equal to or greater than 60% and particularly preferably 100%. In the mold 20 shown in FIG. 2, the proportion P3 is 100%.

It is preferred if the dimples 16 are densely arranged in the low-latitude region of the golf ball 2. The golf ball 2 achieves a superior dimple effect when the equator Eq agrees with the fastest part of the backspin. The golf ball 2 has excellent aerodynamic symmetry. The golf ball 2 also has excellent appearance. Arrangement of multiple kinds of dimples 16 having diameters different from one another in the low-latitude region enables achievement of high density of the dimples 16 in the low-latitude region. In light of aerodynamic symmetry and appearance, the number of kinds of the dimples 16 that are present in the low-latitude region is preferably equal to or greater than 2 and more preferably equal to or greater than 3. In the mold 20 shown in FIG. 2, pimples B, pimples C and pimples D are present in the low-latitude region. The number of kinds of the pimples 28 in the low-latitude region of the mold 20 is 3. Thus, the number of kinds of the dimples 16 that are present in the low-latitude region of the golf ball 2 shown in FIGS. 6 and 7 is 3.

When all the dimples 16 that are present in the low-latitude region are sorted in descending order of the diameter, the ratio (Dx1/Dn1) of the average diameter Dx1 of the dimples 16 in the top 10% and the average diameter Dn1 of the dimples 16 in the bottom 10% is preferably equal to or less than 1.15. The golf ball 2 achieves a superior dimple effect when the equator Eq agrees with the fastest part of the backspin. The golf ball 2 has excellent aerodynamic symmetry. In light of aerodynamic symmetry, the ratio (Dx1/Dn1) is more preferably equal to or less than 1.10 and particularly preferably equal to or less than 1.07. The low-latitude region of the golf ball 2 shown in FIGS. 6 and 7 has 36 dimples B, 48 dimples C and 36 dimples D. The number of the dimples 16 in the low-latitude region is 120. Thus, 12 dimples B correspond to "the dimples 16 in the top 10%", and 12 dimples D correspond to "the dimples 16 in the bottom 10%". In the golf ball 2, the Dx1 is 4.40 mm, while the Dn1 is 4.10 mm. Accordingly, the ratio (Dx1/Dn1) is 1.07.

When all the dimples 16 are sorted in descending order of the diameter, the ratio (Dx2/Dn2) of the average diameter Dx2 of the dimples 16 in the top 10% and the average diameter Dn2 of the dimples 16 in the bottom 10% is preferably equal to or less than 1.30. The golf ball 2 having a ratio (Dx2/Dn2) of 1.30 or less has excellent flight performance. In light of flight performance, the ratio (Dx2/Dn2) is preferably equal to or less than 1.20 and more preferably equal to or less than 1.16. The ratio (Dx2/Dn2) of the golf ball 2 shown in FIGS. 6 and 7 is 1.16.

The standard deviation $\Sigma 1$ of the diameters of all the dimples 16 that are present in the low-latitude region is preferably equal to or less than 0.15. The golf ball 2 achieves a superior dimple effect when the equator Eq agrees with the fastest part of the backspin. The golf ball 2 has excellent aerodynamic symmetry. In light of aerodynamic symmetry, the standard deviation $\Sigma 1$ is more preferably equal to or less than 0.12. In the low-latitude region of the golf ball 2 shown in FIGS. 6 and 7, the average diameter of the dimples 16 is 4.27 mm. Thus, the standard deviation $\Sigma 1$ is calculated by the following formula.

$$\Sigma 1 = (((4.40-4.27)^2 * 36 + (4.30-4.27)^2 * 48 + (4.10-4.27)^2 * 36)/120)^{1/2}$$

In the golf ball 2, the standard deviation $\Sigma 1$ is 0.12.

The standard deviation $\Sigma 2$ of the diameters of all the dimples 16 is preferably equal to or less than 0.30. The golf ball 2 having a standard deviation $\Sigma 2$ of 0.30 or less has excellent flight performance. In light of flight performance, the standard deviation $\Sigma 2$ is more preferably equal to or less than 0.25 and particularly preferably equal to or less than 0.20. The standard deviation $\Sigma 2$ of the golf ball 2 shown in FIGS. 6 and 7 is 0.20.

In FIG. 3, what is indicated by arrows Hp is the height of the protrusion 34 from the equator Eq. In light of superior dimple effect achieved when the equator Eq agrees with the fastest part of the backspin, the height Hp is preferably equal to or greater than 0.2 mm, more preferably equal to or greater than 0.3 mm, and particularly preferably equal to or greater than 0.4 mm. In light of durability of the mold 20, the height Hp is preferably equal to or less than 1.5 mm and more preferably equal to or less than 1.3 mm.

The width of the intersection of the dimple 16 with the equator Eq is nearly the same as the height of the Hp of the protrusion 34. In light of dimple effect, the width of the intersection is preferably equal to or greater than 0.2 mm, more preferably equal to or greater than 0.3 mm, and particularly preferably equal to or greater than 0.4 mm. In light of ease of manufacturing the golf ball 2, the width of the intersection is preferably equal to or less than 1.5 mm and more preferably equal to or less than 1.3 mm.

In light of ease of manufacturing the golf ball 2 and the durability of the mold 20, the absolute value of the difference (Hp1−Hp2) between the height Hp1 of the highest protrusion 34 and the height Hp2 of the lowest protrusion 34 is preferably equal to or less than 0.5 mm. Ideally, the difference (Hp1−Hp2) is zero. In other words, it is preferred if the heights of all the protrusions 34 from the equator are the same.

Figure 8:
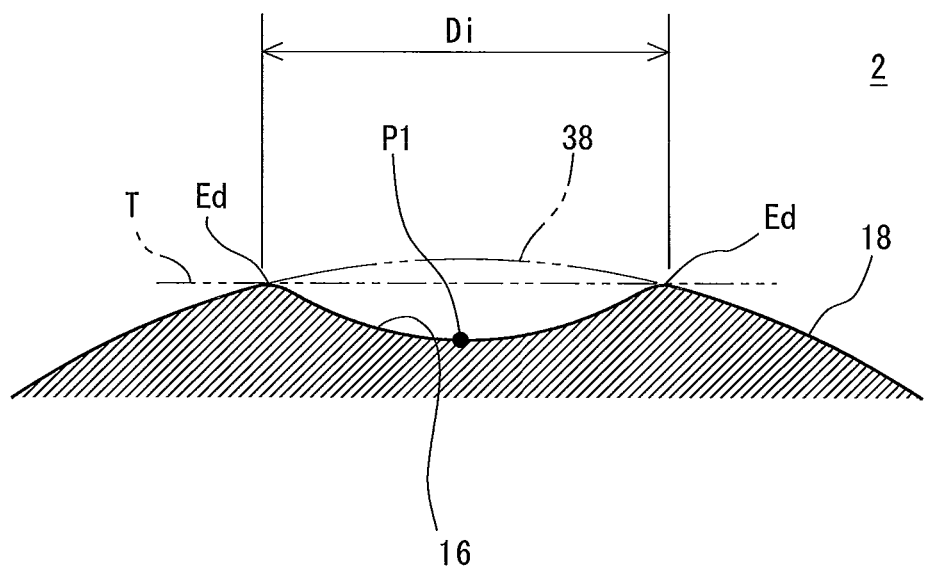
FIG. 8 is a partially enlarged cross-sectional view of the golf ball in FIG. 1.

FIG. 8 is a partially enlarged cross-sectional view of the golf ball 2 in FIG. 1. In FIG. 8, a cross section along a plane passing through the deepest part of the dimple 16 and the center of the golf ball 2 is shown. In FIG. 8, the top-to-bottom direction is the depth direction of the dimple 16. What is indicated by a chain double-dashed line 38 in FIG. 8 is a phantom sphere. The dimple 16 is recessed from the surface of the phantom sphere 38. The land 18 agrees with the surface of the phantom sphere 38.

In FIG. 8, what is indicated by a double ended arrow Di is the diameter of the dimple 16. The diameter Di is a distance between two tangent points Ed appearing on a tangent line T which is drawn tangent to the far opposite ends of the dimple 16. The tangent point Ed is also the edge of the dimple 16. The edge Ed defines the contour of the dimple 16. The diameter Di is preferably equal to or greater than 2.00 mm and equal to or less than 6.00 mm. By setting the diameter Di to be equal to or greater than 2.00 mm, a superior dimple effect is achieved. In this respect, the diameter Di is more preferably equal to or greater than 2.20 mm and particularly preferably equal to or greater than 2.40 mm. By setting the diameter Di to be equal to or less than 6.00 mm, a fundamental feature of the golf ball 2 being substantially a sphere is maintained. In this respect, the diameter Di is more preferably equal to or less than 5.80 mm and particularly preferably equal to or less than 5.60 mm.

In the present invention, the ratio of the sum of the areas of all the dimples 16 to the surface area of the phantom sphere 38 is referred to as an occupation ratio. From the standpoint that a sufficient dimple effect is achieved, the occupation ratio is preferably equal to or greater than 75%, more preferably equal to or greater than 76%, and particularly preferably equal to or greater than 77%. The occupation ratio is preferably equal to or less than 86%, more preferably equal to or less than 85%, and particularly preferably equal to or less than 84%.

In the present invention, the term "dimple volume" means the volume of a part surrounded by the surface of the dimple 16 and a plane that includes the contour of the dimple 16. In light of suppression of rising of the golf ball 2 during flight, the total volume of the dimples 16 is preferably equal to or greater than 250 mm$^3$, more preferably equal to or greater than 260 mm$^3$, and particularly preferably equal to or greater than 270 mm$^3$. In light of suppression of dropping of the golf ball 2 during flight, the total volume of the dimples 16 is preferably equal to or less than 400 mm$^3$, more preferably equal to or less than 390 mm$^3$, and particularly preferably equal to or less than 380 mm$^3$.

In light of suppression of rising of the golf ball 2 during flight, the depth of the dimple 16 is preferably equal to or greater than 0.05 mm, more preferably equal to or greater than 0.08 mm, and particularly preferably equal to or greater than 0.10 mm. In light of suppression of dropping of the golf ball 2 during flight; the depth of the dimple 16 is preferably equal to or less than 0.60 mm, more preferably equal to or less than 0.45 mm, and particularly preferably equal to or less than 0.40 mm. The depth of the dimple 16 is the distance between the tangent line T and the deepest part of the dimple 16.

From the standpoint that a sufficient dimple effect is achieved, the total number of the dimples 16 is preferably equal to or greater than 250 and particularly preferably equal to or greater than 270. From the standpoint that individual dimples 16 can have a sufficient diameter, the total number of the dimples 16 is preferably equal to or less than 400 and more preferably equal to or less than 370.

EXAMPLES

Example 1

A rubber composition was obtained by kneading 100 parts by weight of polybutadiene (trade name "BR-730", available from JSR Corporation), 36 parts by weight of zinc diacrylate, 10 parts by weight of zinc oxide, an appropriate amount of barium sulfate, 0.5 part by weight of diphenyl disulfide and 0.6 part by weight of dicumyl peroxide (available from NOF Corporation). This rubber composition was placed into a mold including upper and lower mold halves each having a hemispherical cavity, and heated at 170° C. for 20 minutes to obtain a center with a diameter of 39.7 mm.

A resin composition was obtained by kneading 60 parts by weight of an ionomer resin (the aforementioned "Himilan 1605"), 40 parts by weight of another ionomer resin (the aforementioned "Himilan 1706"), and 3 parts by weight of titanium dioxide with a twin-screw kneading extruder. The center was covered with this resin composition by injection molding to obtain a mid layer with a thickness Tm of 1.0 mm.

A paint composition (trade name "POLIN 750LE", available from SHINTO PAINT CO., LTD.) including a two-component curing type epoxy resin as abase polymer was prepared. The base material liquid of this paint composition includes 30 parts by weight of a bisphenol A type solid epoxy resin and 70 parts by weight of a solvent. The curing agent liquid of this paint composition includes 40 parts by weight of modified polyamide amine, 55 parts by weight of a solvent, and 5 parts by weight of titanium dioxide. The weight ratio of the base material liquid to the curing agent liquid was 1/1. This paint composition was applied on the surface of the mid layer with a spray gun, and maintained at 40° C. for 24 hours to obtain a reinforcing layer.

A resin composition was obtained by kneading 100 parts by weight of thermoplastic polyurethane (aforementioned "Elastollan XNY85A"), 25 parts by weight of a polyisocyanate mixture (described in detail later), and 3 parts by weight of titanium dioxide. Two half shells were obtained from this resin composition by compression molding. The spherical body including the center, the mid layer and the reinforcing layer was covered with the two half shells. The spherical body and the half shells were placed into a mold having a large number of pimples on its cavity face, and compression molding was performed to obtain a cover with a thickness of 0.5 mm. A large number of dimples having a shape inverted from the shape of the pimples were formed on the cover. A clear paint including a two-component curing type polyurethane as a base material was applied on this cover to form a paint layer, resulting in a golf ball with a diameter of 42.8 mm and a weight of 45.5 g. The golf ball has the dimple pattern shown in FIGS. 6 and 7. The specifications of the dimples are shown in detail in the following Table 4.

Examples 2 to 4 and Comparative Examples 1 to 3

Golf balls of Examples 2 to 4 and Comparative Examples 1 to 3 were obtained in a similar manner as Example 1, except the specifications of the center, the mild layer, the cover, and the dimples were set as shown in the following Tables 5 and 6. The composition of the center is shown in detail in the following Table 1. The composition of the mid layer is shown in detail in the following Table 2. The composition of the cover is shown in detail in the following Table 3. The specifications of the dimples are shown in detail in the following Table 4.

[Aerodynamic Symmetry]

A driver with a titanium head (Trade name "XXIO", available from SRI Sports Limited, shaft hardness: X, loft angle: 9°) was attached to a swing machine available from True Temper Co. The machine condition was set to have a head speed of 49 m/sec, and a golf ball was hit. The distance from a launch point to a landing point was measured. At the test, the weather was almost calm. The average value of 20 measurements for each of pole shot (POP) and seam shot (PH) was calculated. At pole shot, a golf ball was hit such that a straight line on the plane including the equator became the rotational axis of the backspin. At seam shot, a golf ball was hit such that a line connecting both poles became the rotational axis of the backspin. Evaluation of the aerodynamic symmetry was categorized into the following criteria:

A: the difference between the flight distances upon pole shot and upon seam shot was less than 0.5 m;
B: the difference between the flight distances upon pole shot and upon seam shot was equal to or greater than 0.5 m and less than 1.0 m;
C: the difference between the flight distances upon pole shot and upon seam shot was equal to or greater than 1.0 m and less than 1.5 m; and
D: the difference between the flight distances upon pole shot and upon seam shot was equal to or greater than 1.5 m.

The results are shown in the following Tables 5 and 6.

[Spin Performance]

An approach wedge (trade name "SRIXON I-302" available from SRI Sports Limited) was attached to the above swing machine. The machine condition was set to have a head speed of 21 m/sec, a golf ball was hit, and the spin rate immediately after the hitting was measured. The average value of 10 measurements is shown in the following Tables 5 and 6.

[Evaluation of Scuff Resistance]

A sand wedge was attached to the above swing machine. The machine condition was set to have a head speed of 36 m/sec, and a golf ball was hit. The surface of the golf ball was visually observed, and evaluation was categorized into the following criteria:

A: there was almost no scuff;
B: there was a slight scuff;
C: there were a scuff and fluff; and
D: there were a wide scuff and conspicuous fluff.

The results are shown in the following Tables 5 and 6.

[Flight Stability]

A driver with a titanium head (Trade name "XXIO", available from SRI Sports Limited, shaft hardness: X, loft angle: 9°) was attached to a swing machine available from True Temper Co. The machine condition was set to have a head speed of 49 m/sec, and a golf ball was hit. The hitting was performed 12 times, and the distance between the rightmost landing point and the leftmost landing point was measured. The result was categorized into the following criteria:

A: the distance was less than 5 m;
B: the distance was equal to or greater than 5 m and less than 10 m;
C: the distance was equal to or greater than 10 m and less than 15 m; and
D: the distance was equal to or greater than 15 m.

The results are shown in the following Tables 5 and 6.

TABLE 1

Composition of Center

| | (a) | (b) |
| --- | --- | --- |
| | (parts by weight) | |
| Polybutadiene | 100 | 100 |
| Zinc diacrylate | 36 | 40 |
| Zinc oxide | 10 | 10 |
| Barium sulfate | Appropriate amount | Appropriate amount |
| Diphenyl disulfide | 0.5 | 0.5 |
| Dicumyl peroxide | 0.6 | 0.7 |

TABLE 2

Composition of Mid layer

| | (c) | (d) |
| --- | --- | --- |
| | (parts by weight) | |
| Ionomer resin (1605) *1 | 60 | 60 |
| Ionomer resin (1706) *2 | 40 | 40 |
| Zinc oxide | — | 10 |
| Titanium dioxide | 3 | 3 |
| Hardness (Shore D) | 65 | 67 |

*1 Himilan 1605 (Du Pont-MITSUI POLYCHEMICALS Co., Ltd.)
*2 Himilan 1706 (Du Pont-MITSUI POLYCHEMICALS Co., Ltd.)

TABLE 3

Composition of Cover

| | (e) | (f) | (g) | (h) | (i) | (j) |
| --- | --- | --- | --- | --- | --- | --- |
| | (parts by weight) | | | | | |
| Thermoplastic polyurethane *3 | — | 100 | — | — | — | 100 |
| Thermoplastic polyurethane *4 | 100 | — | 100 | 100 | 100 | — |
| Polyisocyanate mixture *5 | 25 | — | — | 15 | — | — |
| Polyisocyanate mixture *6 | — | 35 | — | — | — | — |
| Polyisocyanate mixture *7 | — | — | 1.4 | — | — | — |
| Polyisocyanate mixture *8 | — | — | — | — | 1.3 | — |
| Polyisocyanate mixture *9 | — | — | — | — | — | 1.3 |
| Titanium dioxide | 3 | 3 | 3 | 3 | 3 | 3 |

*3 Elastollan XNY90A (BASF Japan Ltd.)
*4 Elastollan XNY85A (BASF Japan Ltd.)

The polyisocyanate mixture (*5) used for the cover includes 1000 parts by weight of a urethane prepolymer and 2000 parts by weight of a thermoplastic polyester elastomer (trade name "Hytrel 3046" available from DU PONT-TORAY Co., Ltd.). In the mixture, the urethane prepolymer is dispersed in the polyester elastomer. The urethane prepolymer is one obtained by reacting 250 parts by weight of 4,4'-diphenylmethane diisocyanate (number average molecular weight: 250) with 750 parts by weight of polyoxytetramethylene glycol (number average molecular weight: 1000). The amount of isocyanate group (NCO %) in the urethane prepolymer is 2.1% by weight. The amount of isocyanate group (NCO %) in the mixture is 0.7% by weight.

The polyisocyanate mixture (*6) used for the cover includes 1762 parts by weight of a urethane prepolymer and 3524 parts by weight of a thermoplastic polyester elastomer (the aforementioned "Hytrel 3046"). In the mixture, the urethane prepolymer is dispersed in the polyester elastomer. The urethane prepolymer is one obtained by reacting 262 parts by weight of 4,4'-dicyclohexylmethane diisocyanate (number average molecular weight: 262) with 1500 parts by weight of polyoxytetramethylene glycol (number average molecular weight: 2000). The amount of isocyanate group (NCO %) in the urethane prepolymer is 1.2% by weight. The amount of isocyanate group (NCO %) in the mixture is 0.4% by weight.

The polyisocyanate mixture (*7) used for the cover includes 504.6 parts by weight of an isocyanurate (trade name "Takenate D-170N", available from Mitsui Chemicals Polyurethanes, Inc., molecular weight: 504.6) and 750 parts by weight of a thermoplastic polyester elastomer (the aforementioned "Hytrel 3046"). In the mixture, the isocyanurate is dispersed in the polyester elastomer. The amount of isocyanate group (NCO %) in the isocyanurate is 25% by weight. The amount of isocyanate group (NCO %) in the mixture is 10% by weight.

The polyisocyanate mixture (*8) used for the cover includes 250 parts by weight of 4,4'-diphenylmethane diisocyanate (number average molecular weight: 250) and 500 parts by weight of a thermoplastic polyester elastomer (the aforementioned "Hytrel 3046"). In the mixture, the diisocyanate is dispersed in the polyester elastomer. The amount of isocyanate group (NCO %) in the mixture is 11.2% by weight.

The polyisocyanate mixture (*9) used for the cover includes 262 parts by weight of 4,4'-dicyclohexylmethane diisocyanate (number average molecular weight: 262) and 500 parts by weight of a thermoplastic polyester elastomer (the aforementioned "Hytrel 3046"). In the mixture, the diisocyanate is dispersed in the polyester elastomer. The amount of isocyanate group (NCO %) in the mixture is 11% by weight.

TABLE 4

Specifications of Dimples

Figure 9:
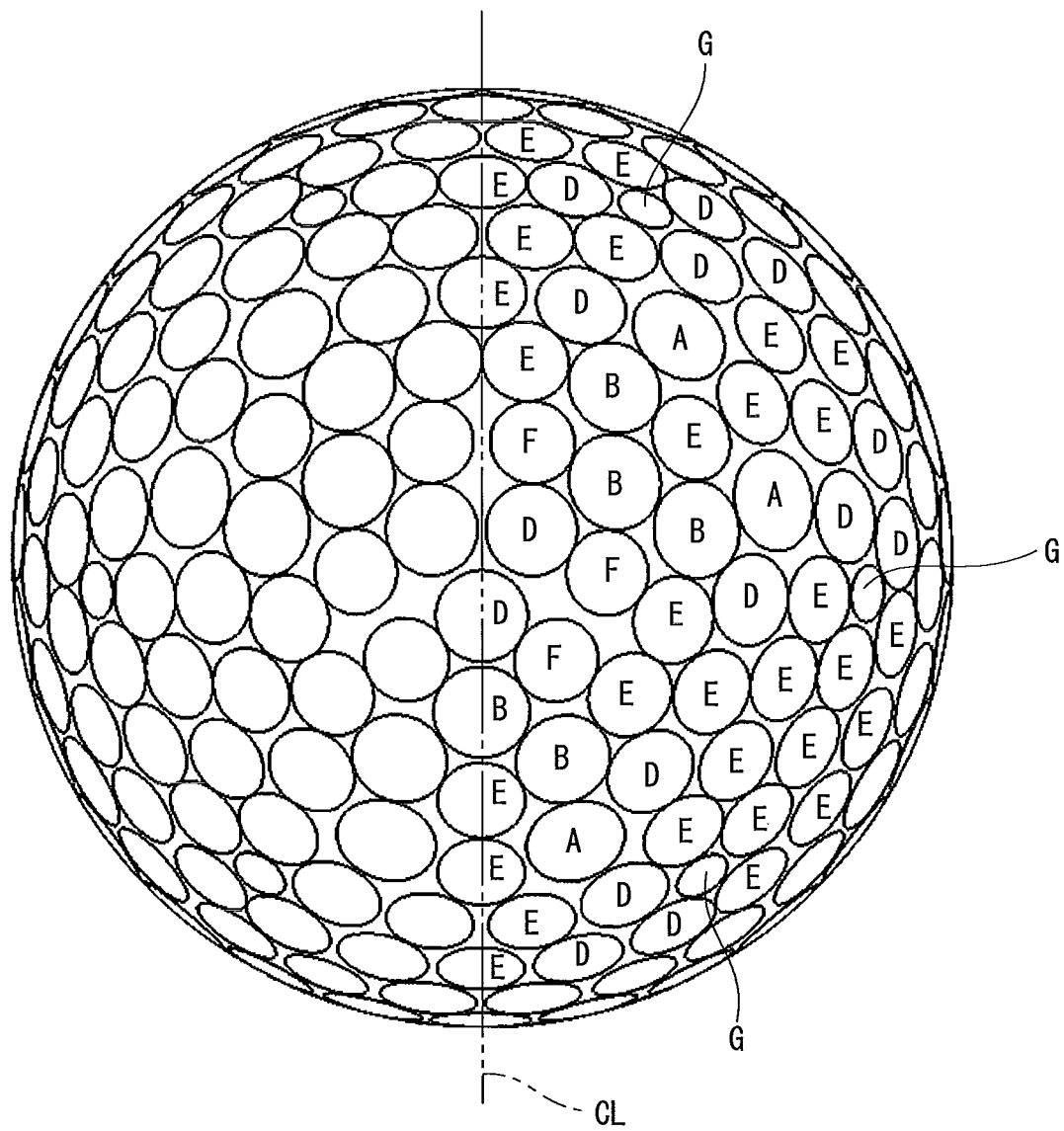
FIG. 9 is a plan view of a golf ball according to Example 2 of the present invention.
Figure 10:
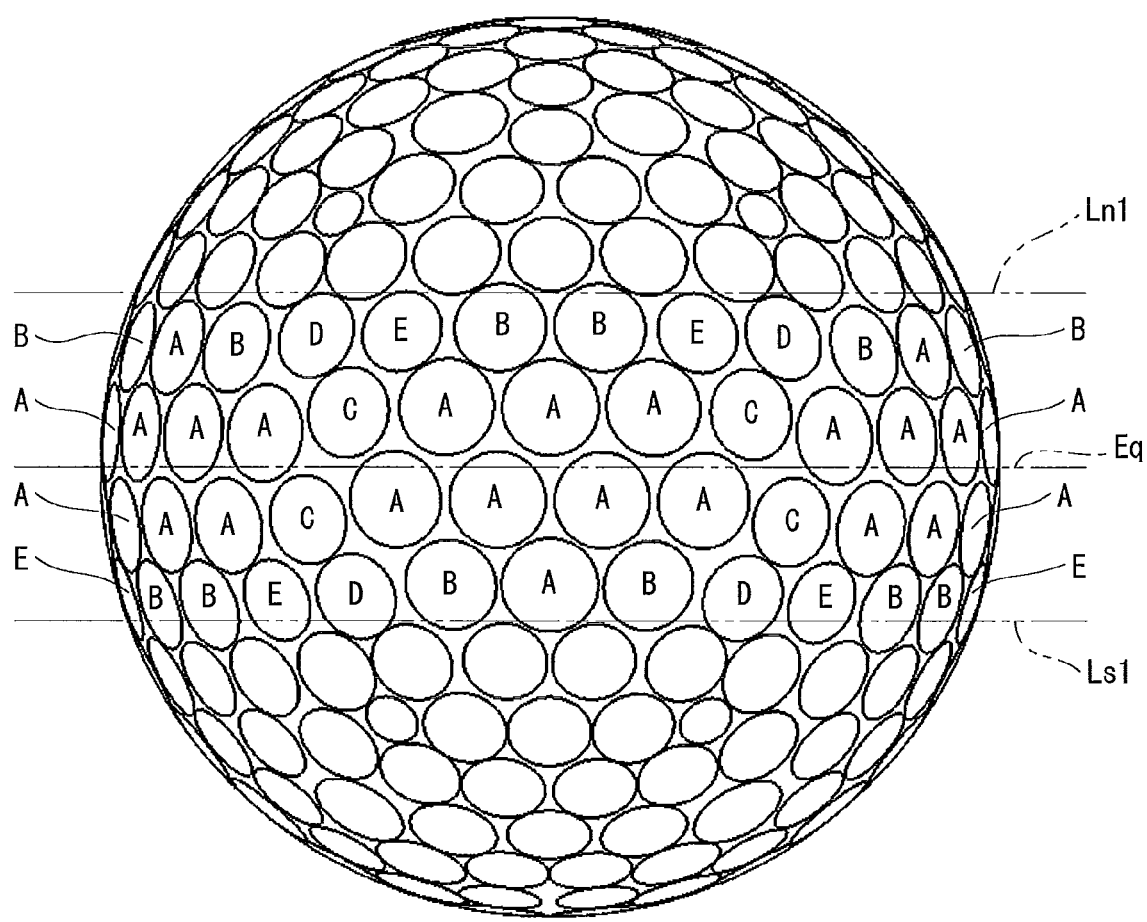
FIG. 10 is a front view of the golf ball in FIG. 9.
Figure 11:
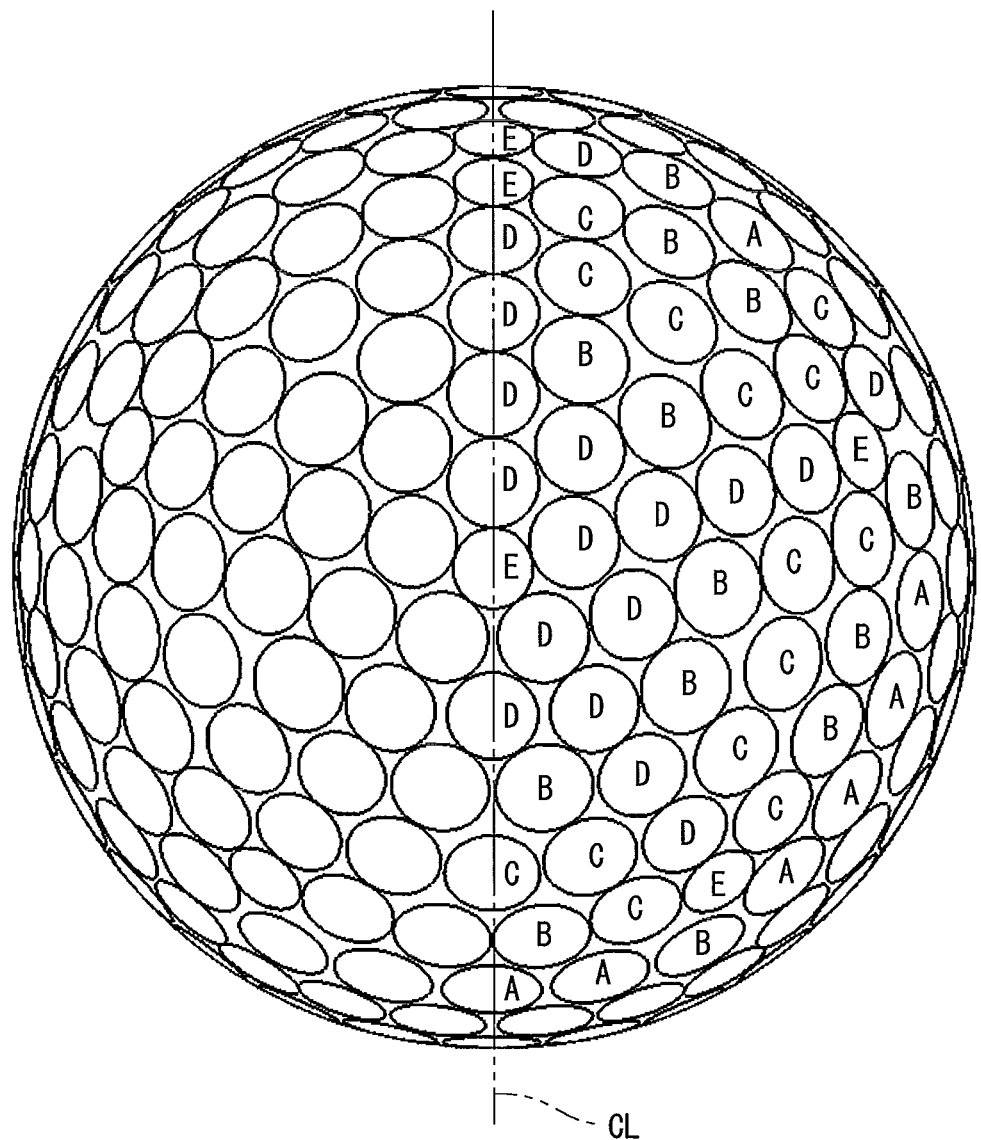
FIG. 11 is a plan view of a golf ball according to Example 4 of the present invention.
Figure 12:
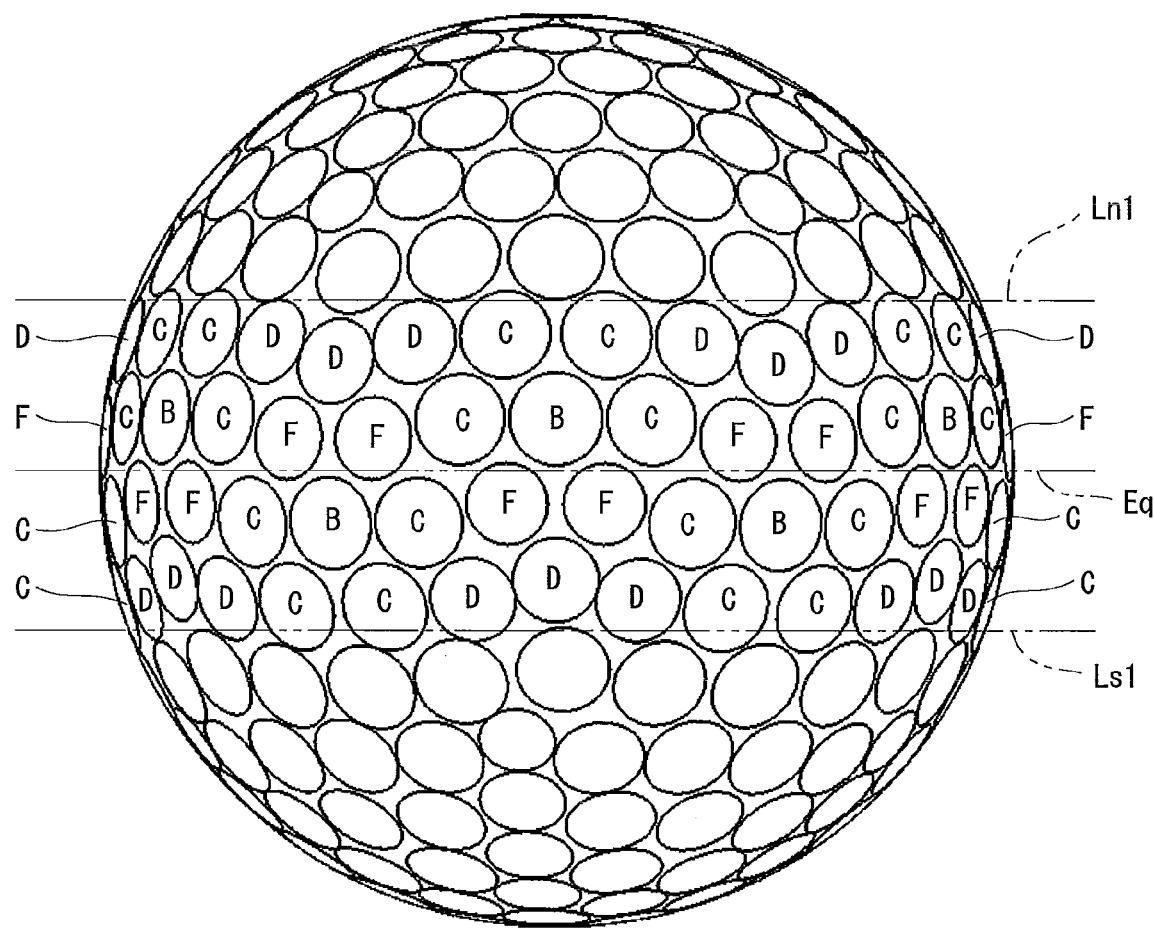
FIG. 12 is a front view of the golf ball in FIG. 11.
Figure 13:
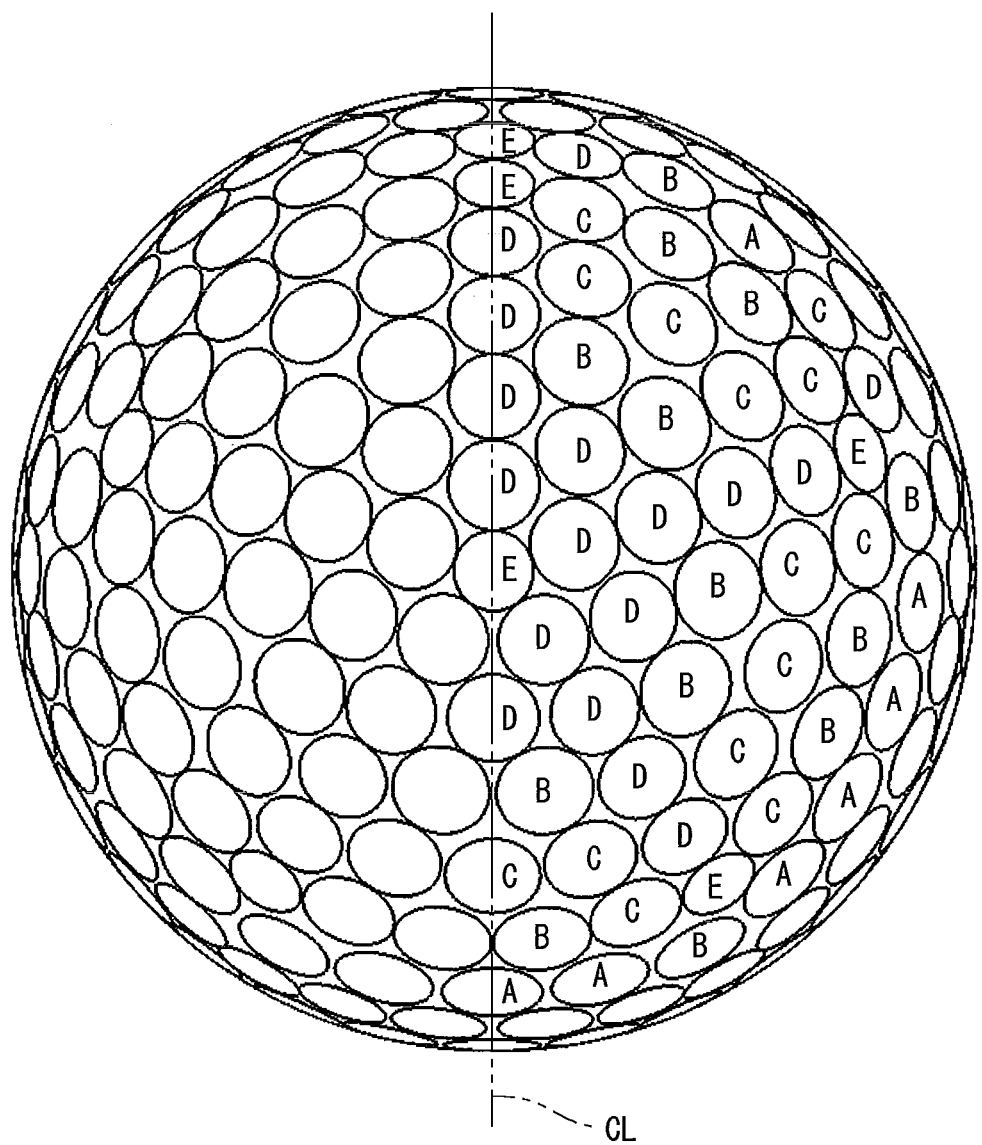
FIG. 13 is a front view of a golf ball according to Comparative Example 1.
Figure 14:
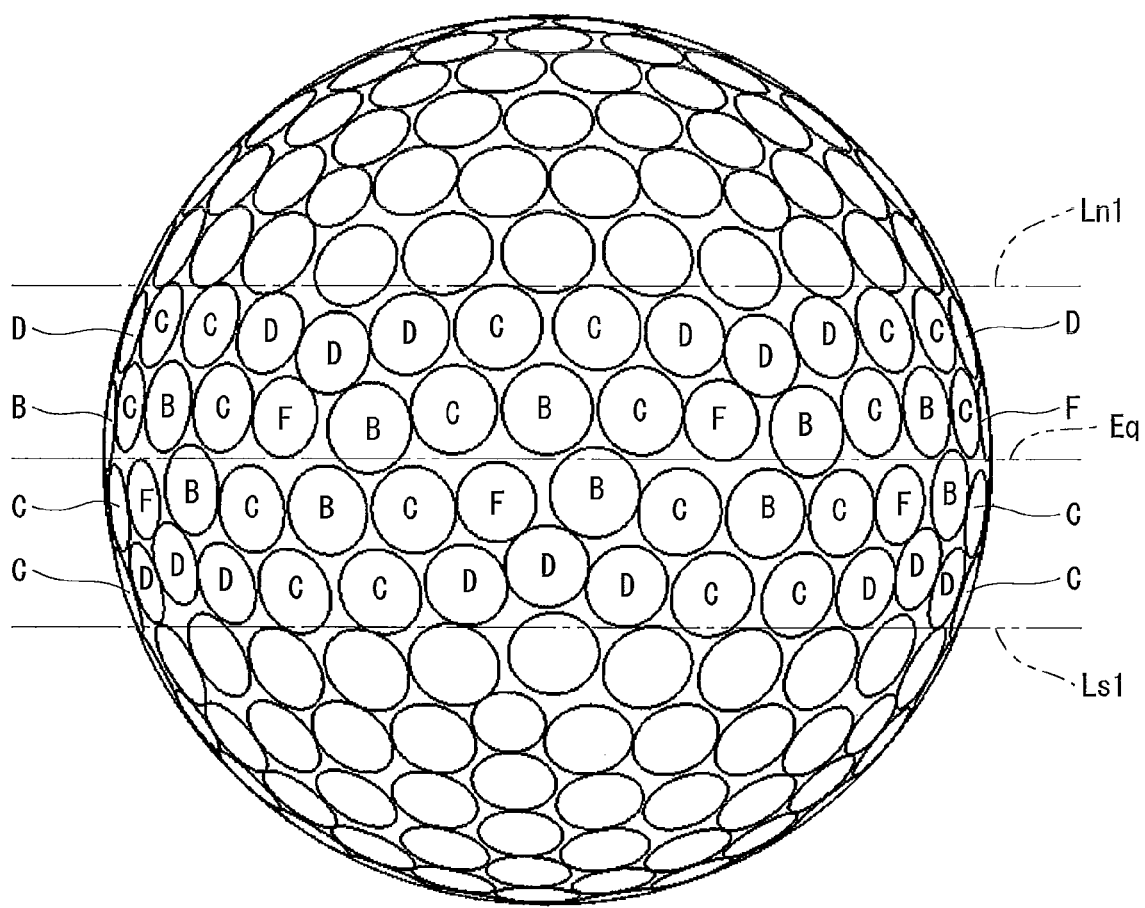
FIG. 14 is a plan view of the golf ball in FIG. 13.
Figure 15:
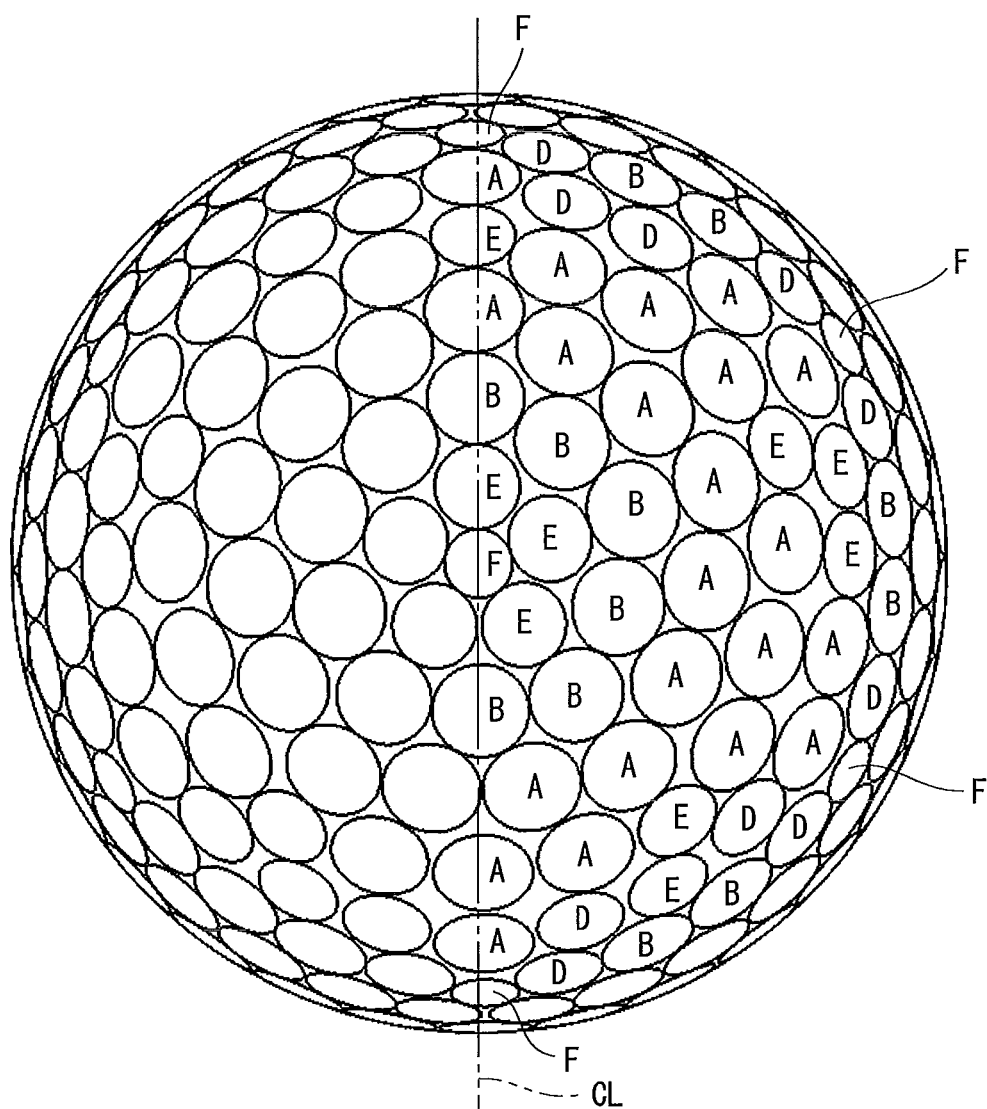
FIG. 15 is a front view of a golf ball according to Comparative Example 3.
Figure 16:
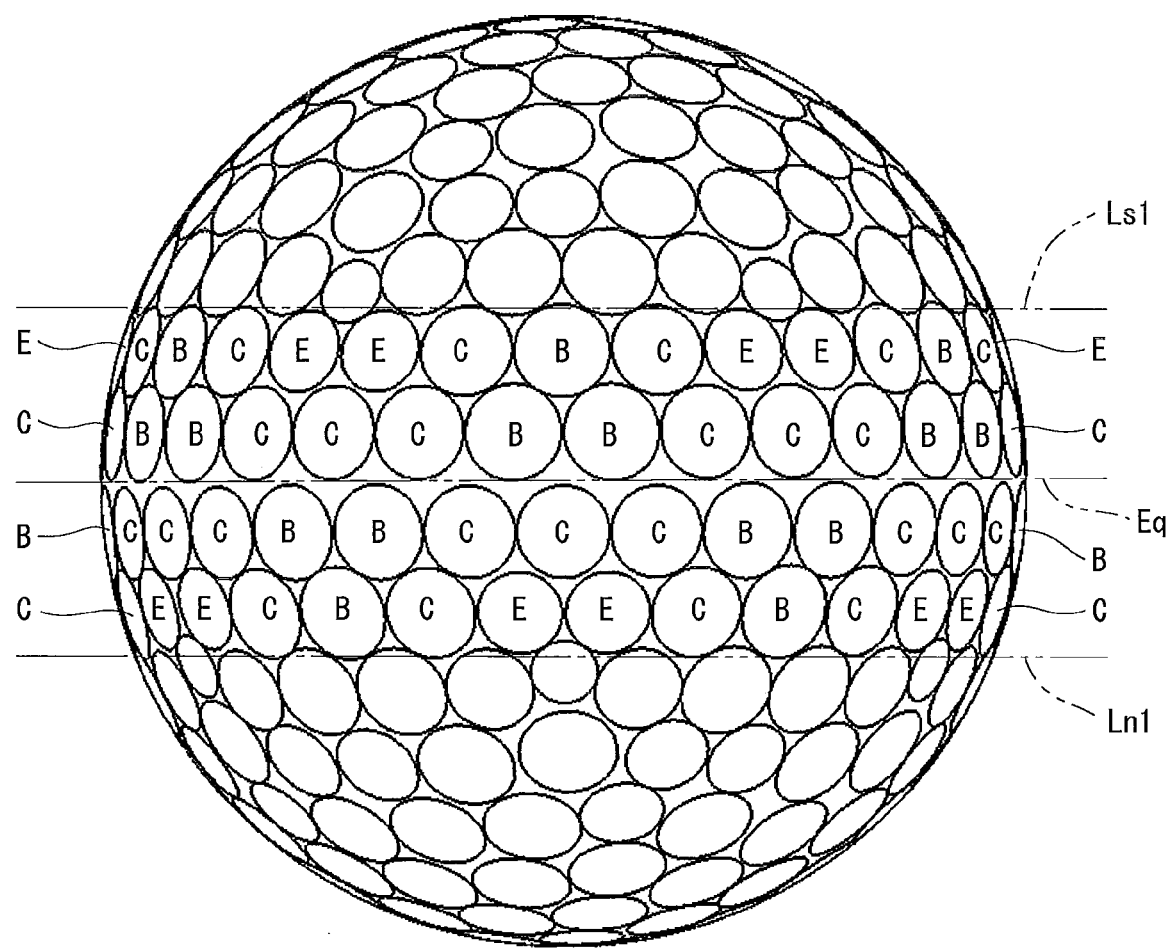
FIG. 16 is a plan view of the golf ball in FIG. 15.

| Pattern | Kind | Number | Diameter (mm) | Depth (mm) | Volume (mm$^3$) | Number N1 | Number N2 | Plan view Front view |
|---|---|---|---|---|---|---|---|---|
| I | A | 26 | 4.50 | 0.142 | 1.131 | 0 | 0 | FIG. 6 |
|  | B | 88 | 4.40 | 0.142 | 1.081 | 24 | 36 | FIG. 7 |
|  | C | 102 | 4.30 | 0.142 | 1.033 | 0 | 48 |  |
|  | D | 94 | 4.10 | 0.142 | 0.939 | 0 | 36 |  |
|  | E | 14 | 3.60 | 0.142 | 0.724 | 0 | 0 |  |
| II | A | 60 | 4.60 | 0.144 | 1.198 | 24 | 42 | FIG. 9 |
|  | B | 42 | 4.40 | 0.144 | 1.096 | 0 | 24 | FIG. 10 |
|  | C | 12 | 4.30 | 0.144 | 1.047 | 0 | 12 |  |
|  | D | 66 | 4.20 | 0.144 | 0.999 | 0 | 12 |  |
|  | E | 126 | 4.00 | 0.144 | 0.906 | 0 | 12 |  |
|  | F | 12 | 3.90 | 0.144 | 0.862 | 0 | 0 |  |
|  | G | 12 | 2.60 | 0.144 | 0.384 | 0 | 0 |  |
| III | A | 26 | 4.50 | 0.142 | 1.131 | 0 | 0 | FIG. 11 |
|  | B | 64 | 4.40 | 0.142 | 1.081 | 0 | 12 | FIG. 12 |
|  | C | 102 | 4.30 | 0.142 | 1.033 | 0 | 48 |  |
|  | D | 94 | 4.10 | 0.142 | 0.939 | 0 | 36 |  |
|  | F | 24 | 3.90 | 0.142 | 0.850 | 24 | 24 |  |
|  | E | 14 | 3.60 | 0.142 | 0.724 | 0 | 0 |  |
| IV | A | 26 | 4.50 | 0.142 | 1.131 | 0 | 0 | FIG. 13 |
|  | B | 76 | 4.40 | 0.142 | 1.081 | 12 | 24 | FIG. 14 |
|  | C | 102 | 4.30 | 0.142 | 1.033 | 0 | 48 |  |
|  | D | 94 | 4.10 | 0.142 | 0.939 | 0 | 36 |  |
|  | F | 12 | 3.90 | 0.142 | 0.850 | 0 | 12 |  |
|  | E | 14 | 3.60 | 0.142 | 0.724 | 0 | 0 |  |
| V | A | 80 | 4.55 | 0.139 | 1.131 | 0 | 0 | FIG. 15 |
|  | B | 80 | 4.45 | 0.139 | 1.082 | 0 | 36 | FIG. 16 |
|  | C | 60 | 4.25 | 0.139 | 0.987 | 0 | 60 |  |
|  | D | 40 | 4.10 | 0.139 | 0.919 | 0 | 0 |  |
|  | E | 56 | 3.85 | 0.139 | 0.810 | 0 | 24 |  |
|  | F | 14 | 3.00 | 0.139 | 0.493 | 0 | 0 |  |

N1: the number of dimples that intersect with the equator
N2: the number of dimples that are present in the low-latitude region

TABLE 5

Results of Evaluation

| | | Example 1 | Example 2 | Example 3 | Example 4 |
|---|---|---|---|---|---|
| Center | Composition | (a) | (b) | (a) | (a) |
|  | Diameter (mm) | 39.7 | 40.1 | 39.7 | 39.3 |
|  | Compressive deformation (mm) | 3.1 | 2.5 | 3.1 | 3.1 |
|  | Central hardness H1 (JIS-C) | 66 | 70 | 66 | 66 |
|  | Surface hardness H2 (JIS-C) | 84 | 86 | 84 | 84 |
|  | H2 − H1 | 18 | 16 | 18 | 18 |
| Mid layer | Composition | (c) | (d) | (c) | (c) |
|  | Thickness (mm) | 1.0 | 1.0 | 1.0 | 1.0 |
| Cover | Composition | (e) | (f) | (g) | (h) |
|  | Hardness (Shore D) | 32 | 38 | 32 | 32 |
|  | Thickness (mm) | 0.5 | 0.3 | 0.5 | 0.7 |

TABLE 5-continued

Results of Evaluation

|  |  |  | Example 1 | Example 2 | Example 3 | Example 4 |
|---|---|---|---|---|---|---|
| Mold | Number of protrusions | | 24 | 24 | 24 | 24 |
|  | Angle θ1-θ2 (degree) | | 12.4-17.6 | 13.5-19.5 | 12.4-17.6 | 12.4-17.6 |
|  |  | | | 13.5-13.5 | | |
|  | Proportion P1 (%) | | 100 | 50 | 100 | 100 |
|  | Proportion P2 (%) | | 100 | 50 | 100 | 100 |
|  | Proportion P3 (%) | | 100 | 50 | 100 | 100 |
| Dimple | Pattern | | I | II | I | III |
|  | Entire | Number | 324 | 330 | 324 | 324 |
|  | ball | Occupation ratio (%) | 80.6 | 78.8 | 80.6 | 79.2 |
|  |  | Standard deviation Σ2 | 0.19 | 0.38 | 0.19 | 0.21 |
|  |  | Dx2/Dn2 | 1.16 | 1.33 | 1.16 | 1.19 |
|  | Low- | Number | 120 | 102 | 120 | 120 |
|  | latitude | Standard deviation Σ1 | 0.12 | 0.20 | 0.12 | 0.17 |
|  | region | Dx1/Dn1 | 1.07 | 1.15 | 1.07 | 1.13 |
|  |  | Diameter (mm) | 4.10-4.40 | 4.00-4.60 | 4.10-4.40 | 3.90-4.40 |
|  |  | Number of kinds | 3 | 5 | 3 | 4 |
| Flight | POP | | 246.3 | 249.9 | 246.4 | 245.4 |
| distance (m) | PH | | 246.0 | 249.1 | 246.0 | 245.8 |
|  | Difference | | 0.3 | 0.8 | 0.4 | 0.4 |
| Aerodynamic symmetry | | | A | B | A | A |
| Spin rate (rpm) | | | 6950 | 6890 | 7020 | 6990 |
| Scuff resistance | | | A | B | A | A |
| Flight stability | | | A | B | A | A |

TABLE 6

Results of Evaluation

|  |  |  | Comparative Example 1 | Comparative Example 2 | Comparative Example 3 |
|---|---|---|---|---|---|
| Center | Composition | | (a) | (a) | (a) |
|  | Diameter (mm) | | 39.7 | 38.7 | 39.7 |
|  | Compressive deformation (mm) | | 3.1 | 3.1 | 3.1 |
|  | Central hardness H1 (JIS-C) | | 66 | 66 | 66 |
|  | Surface hardness H2 (JIS-C) | | 84 | 84 | 84 |
|  | H2 − H1 | | 18 | 18 | 18 |
| Mid layer | Composition | | (c) | (c) | (c) |
|  | Thickness (mm) | | 1.0 | 1.0 | 1.0 |
| Cover | Composition | | (i) | (j) | (e) |
|  | Hardness (Shore D) | | 32 | 38 | 32 |
|  | Thickness (mm) | | 0.5 | 1.0 | 0.5 |
| Mold | Number of protrusions | | 12 | 24 | 0 |
|  | Angle θ1-θ2 (degree) | | 30.0-30.0 | 13.5-19.5 | — |
|  |  | | | 13.5-13.5 | |
|  | Proportion P1 (%) | | 0 | 50 | — |
|  | Proportion P2 (%) | | 0 | 50 | — |
|  | Proportion P3 (%) | | 0 | 50 | — |
| Dimple | Pattern | | IV | II | V |
|  | Entire | Number | 324 | 330 | 330 |
|  | ball | Occupation ratio (%) | 79.9 | 78.8 | 81.6 |
|  |  | Standard deviation Σ2 | 0.20 | 0.38 | 0.36 |
|  |  | Dx2/Dn2 | 1.18 | 1.33 | 1.30 |
|  | Low- | Number | 120 | 102 | 120 |
|  | latitude | Standard deviation Σ1 | 0.15 | 0.20 | 0.21 |
|  | region | Dx1/Dn1 | 1.13 | 1.15 | 1.16 |
|  |  | Diameter (mm) | 3.90-4.40 | 4.00-4.60 | 3.85-4.45 |
|  |  | Number of kinds | 4 | 5 | 3 |
| Flight | POP | | 243.2 | 245.6 | 242.1 |
| distance (m) | PH | | 242.0 | 244.8 | 240.1 |
|  | Difference | | 1.2 | 0.8 | 2.0 |
| Aerodynamic symmetry | | | C | B | D |
| Spin rate (rpm) | | | 6720 | 6660 | 6950 |
| Scuff resistance | | | C | D | A |
| Flight stability | | | C | C | D |

As is clear from Tables 5 and 6, the golf ball of each Example has a long flight distance, excellent spin performance, excellent aerodynamic symmetry, and excellent flight stability. From the results of evaluation, advantages of the present invention are clear.

The above description is merely for illustrative examples, and various modifications can be made without departing from the principles of the present invention.

What is claimed is:

1. A golf ball comprising a core, a cover positioned outside the core, and a large number of dimples formed on a surface of the cover, wherein,
   the core includes a center and a mid layer positioned outside the center,
   the cover is formed of a resin composition including thermoplastic polyurethane (A) and a polyisocyanate mixture (B),
   the polyisocyanate mixture (B) includes a urethane prepolymer (B1) having two or more isocyanate groups and a thermoplastic resin (B3) which substantially does not react with an isocyanate group,
   the golf ball is formed by a mold including a pair of mold halves and having a large number of pimples on a cavity face of the mold for forming the dimples,
   each mold half has a plurality of protrusions which project from the equator of the mold,
   each protrusion includes a part of one of the pimples, and
   when one of the mold halves is mated with the other mold half, a central angle between any two adjacent protrusions is equal to or greater than 10° and equal to or less than 20°.

2. The golf ball according to claim 1, wherein the cover has a thickness of 0.1 mm or greater and 0.7 mm or less.

3. The golf ball according to claim 1, wherein the cover has a hardness of 50 or less which is measured with a Shore D type spring hardness scale.

4. The golf ball according to claim 1, wherein an amount of isocyanate group (NCO %) in the polyisocyanate mixture (B) is equal to or greater than 0.1% by weight and equal to or less than 30% by weight.

5. The golf ball according to claim 1, wherein an amount of the polyisocyanate mixture (B) in the resin composition of the cover is equal to or greater than 1 part by weight and equal to or less than 50 parts by weight, per 100 parts by weight of the thermoplastic polyurethane (A).

6. The golf ball according to claim 1, wherein,
the mold includes a protrusion (a); a protrusion (b) adjacent to the protrusion (a); and a protrusion (c) adjacent to the protrusion (a), and
central angle $\theta 1$ between the protrusion (a) and the protrusion (b) is different from central angle $\theta 2$ between the protrusion (a) and the protrusion (c).

7. The golf ball according to claim 6, wherein a proportion P1 of a number of the protrusions (a), each of which has the central angle $\theta 1$ with the protrusion (b) different from the central angle $\theta 2$ with the protrusion (c), to the total number of the protrusions is equal to or greater than 50%.

8. The golf ball according to claim 1, wherein the pimple of which part is included in the protrusion has a diameter of 4.0 mm or greater.

9. A method for manufacturing a golf ball comprising the steps of:

forming two half shells of a resin composition including thermoplastic polyurethane (A) and a polyisocyanate mixture (B) which includes a urethane prepolymer (B1) having two or more isocyanate groups and a thermoplastic resin (B3) which substantially does not react with an isocyanate group;

covering a core, including a center and a mid layer, with the two half shells;

placing the core and the two half shells into a mold which includes a pair of mold halves and has a large number of pimples on a cavity face of the mold for forming dimples, each mold half having a plurality of protrusions which project from the equator of the mold, each protrusion including a part of one of the pimples, a central angle between any two adjacent protrusions being equal to or greater than 10° and equal to or less than 20° when one of the mold halves is mated with the other mold half; and allowing the resin composition to flow in the mold, thereby forming the dimples having a shape inverted from the shape of the pimples and crosslinking the thermoplastic polyurethane (A) with the urethane prepolymer (B1).

* * * * *